US 7,327,938 B2

(12) United States Patent
Ando et al.

(10) Patent No.: US 7,327,938 B2
(45) Date of Patent: *Feb. 5, 2008

(54) SYSTEM FOR RECORDING DIGITAL INFORMATION INCLUDING AUDIO INFORMATION

(75) Inventors: Hideo Ando, Hino (JP); Hideki Mimura, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1420 days.

This patent is subject to a terminal disclaimer.

(21) Appl. No.: 09/954,159

(22) Filed: Sep. 18, 2001

(65) Prior Publication Data

US 2002/0015580 A1    Feb. 7, 2002

Related U.S. Application Data

(60) Division of application No. 09/730,789, filed on Dec. 7, 2000, now Pat. No. 6,658,200, which is a continuation of application No. PCT/JP00/02256, filed on Apr. 7, 2000.

(30) Foreign Application Priority Data

Apr. 7, 1999   (JP) .............................. 11-099716

(51) Int. Cl.
    *H04N 5/91* (2006.01)
(52) U.S. Cl. ...................... 386/95; 386/96; 386/126
(58) Field of Classification Search ............ 386/39,
    386/45, 95, 96, 98, 101, 104–106, 124, 54,
    386/125, 126
    See application file for complete search history.

(56) References Cited

U.S. PATENT DOCUMENTS

| 3,919,716 | A  | * | 11/1975 | Yumde et al. ................ 386/96 |
| 5,895,123 | A  | * | 4/1999  | Fujii et al. .................... 386/96 |
| 6,167,192 | A  | * | 12/2000 | Heo .......................... 386/124 |
| 6,212,330 | B1 | * | 4/2001  | Yamamoto et al. ........... 386/95 |
| 6,453,113 | B1 | * | 9/2002  | Sakai et al. ................... 386/54 |
| 6,453,119 | B1 | * | 9/2002  | Maruyama et al. ........... 386/95 |
| 6,549,722 | B2 | * | 4/2003  | Okada et al. ................. 386/98 |
| 6,658,200 | B2 | * | 12/2003 | Ando et al. ................... 386/95 |

FOREIGN PATENT DOCUMENTS

| EP | 0 686 973 A1 | 12/1995 |
| EP | 0 856 849   | 8/1998 |
| EP | 0 867 877   | 9/1998 |
| EP | 0 892 404   | 1/1999 |
| EP | 0 896 335   | 2/1999 |
| EP | 0 910 082   | 4/1999 |
| EP | 0 918 331   | 5/1999 |

(Continued)

*Primary Examiner*—James J. Groody
*Assistant Examiner*—Christopher Onuaku
(74) *Attorney, Agent, or Firm*—Oblon, Spivak, McClelland, Maier & Neustadt, P.C.

(57) ABSTRACT

In recording audio information, an information medium in a format obtained by expanding the RTR (recordable/reproducible DVD) standard is used. For management information about each piece of information recorded on the information medium, an "audio information cell" is defined as a playback unit even for audio information as in the RTR standard. To a PGC (program chain) higher in level than the cell, "playback sequence" information about the relationship between other video information (movie cells) and/or still picture information (still picture cells) is given.

4 Claims, 12 Drawing Sheets

FOREIGN PATENT DOCUMENTS

| | | |
|---|---|---|
| EP | 0 949 618 | 10/1999 |
| EP | 0 951 021 | 10/1999 |
| EP | 0 952 578 | 10/1999 |
| EP | 0 967 603 | 12/1999 |
| JP | 7-284064 | 10/1995 |
| JP | 07-284064 | 10/1995 |
| JP | 09-204758 | 8/1997 |
| JP | 9-204758 | 8/1997 |
| JP | 09/259506 | 10/1997 |
| JP | 9-259506 | 10/1997 |
| JP | 11-66827 | 3/1999 |
| JP | 11-120749 | 4/1999 |
| JP | 11-203794 | 7/1999 |
| JP | 2989699 | 10/1999 |
| JP | 2000-322878 | 11/2000 |
| WO | WO 95/16990 | 6/1995 |

* cited by examiner

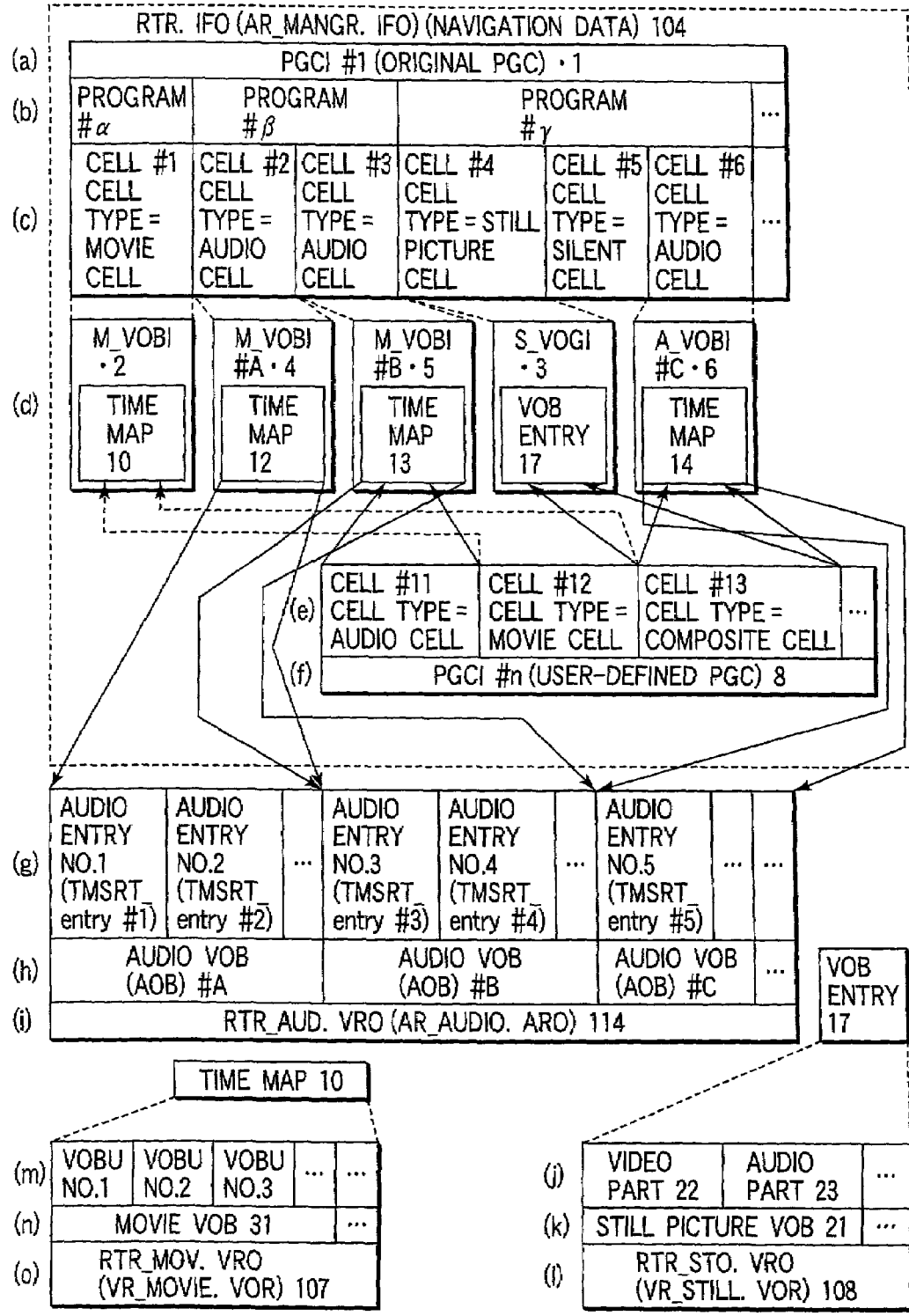
F I G. 1

SYSTEM FOR RECORDING DIGITAL INFORMATION INCLUDING AUDIO INFORMATION

CROSS-REFERENCE TO RELATED APPLICATIONS

This is a division of application Ser. No. 09/730,789 filed Dec. 7, 2000 now U.S. Pat. No. 6,658,200, which is a continuation of Application No. PCT/JP00/02256, filed Apr. 7, 2000, which was not published in English.

This application is based upon and claims the benefit of priority from the prior Japanese Patent Application No. 11-099716, filed Apr. 7, 1999, the entire contents of which are incorporated herein by reference.

BACKGROUND OF THE INVENTION

This invention relates a data structure (or a recording format) capable of recording one or more types of information, including audio information, among video (movie) information, still picture (still image) information, and audio (sound) information and performing common management of these types of information, an information medium for recording information using the data structure, and a method of recording information based on the data structure onto an information medium.

(Prior Art)

DVD videos (for playback only), optical discs on which video information has been recorded by a video compression method complying with the MPEG 2 standard, have already been commercialized and rapidly been popularized. On the other hand, recordable/reproducible DVDs which enable the user to digital-record analog video information have begun to appear on the market. The recordable/reproducible DVD is also called RTR (real-time recording recordable/reproducible DVD). The standardization of streamers that record digital TV broadcast reception video information (digital bit streams) is also in progress. In the format structure conforming to the standard that allows the user to record video information, playback units are represented in cells as in the format of the DVD video disc and the relationship between the individual cells is included in PGC (program chain) control information. Presently, MDs (minidiscs) are available on the market as user-oriented digital audio recording mediums.

(Subjects)

Since the RTR (recordable/reproducible DVD) disc differs from the MD in the disc size and the data format in recording, the MD recording data cannot be recorded directly in the RTR (recordable/reproducible DVD) format. Moreover, in the RTR (recordable/reproducible DVD) standard, audio information cannot be recorded on an information medium independently. Thus, presently, there is no method of recording audio information together with video information and/or still picture information on a single information medium and reproducing those types of information in a mixed manner in an arbitrary order.

(Objects)

An object of the present invention is to provide a data structure (format structure) which enables not only video information, still picture information and/or audio information to be mixed with each other and recorded on the same information medium but also any area in each of the video information, still picture information, and audio information to be reproduced in an arbitrary order.

One other object of the present invention is to provide an information medium on which information is recorded using the data structure (format structure).

Still one other object of the present invention is to provide a method of recording information based on the data structure (format structure) on an information medium.

BRIEF SUMMARY OF THE INVENTION

To accomplish the object, a data structure (or a format structure) according to the present invention is as follows:

1. Audio information is recorded on an information medium in a format obtained by expanding the RTR (recordable/reproducible DVD) standard.

2. For management information about each piece of information recorded on the information medium, an "audio information cell" is defined as a playback unit even for audio information as in the RTR standard. To a PGC (program chain) higher in level than the cell, "playback sequence" information about the relationship between other video information (movie cells) and/or still picture information (still picture cells) is given.

To accomplish the one other object, an information medium according to the present invention has an audio information recording area (RTR_STO.VRO/RTR_STA. VRO/RTR_AUD.VRO/STREAM.VRO) in which audio information is recorded and a management area (RTR.IFO/STREAM.IFO) in which management information about the recording area is recorded. On the information medium, other information (including video information and still picture information) as well as audio information can be recorded. In the management area (RTR.IFO/STREAM.IFO), management information about other information (including video information and still picture information) as well as audio information can be recorded. Moreover, in the management area (RTR.IFO/STREAM.IFO), information about the relationship between all the pieces of audio information in reproducing or information (PGCI) about the relationship between the audio information and information (including video information and still picture information) other than the audio information can be recorded.

To achieve the still one other object, a recording method according to the present invention comprises a first recording process (step ST10) for recording one or more type of information including audio information onto the information medium and a second recording process (step ST12) for writing additionally management information about the recorded information onto the information medium or changing the management information.

In the second recording process (ST12), information (original PGC/user-defined PGC) about the relationship between the audio information and other recording information (video information and/or still picture information) in reproducing the audio information recorded on the information medium in the first recording process (ST10) is written additionally into the management area (RTR.IFO/STREAM.IFO) on the information medium or is changed and recorded in the management area.

To execute what have been described above, an embodiment of the present invention provides the following:

A. Cell type information is given to a piece of information corresponding to each cell. Pieces of identification information called "movie cell," "still picture cell," and "audio cell" are included in the cell type information. This makes it possible to discriminate between video information, still picture information, and audio information and mix these types of information with one another.

B. "Composite cell" information is further included in the cell type information, which provides a structure that makes it possible to reproduce specific (arbitrary) audio information, while reproducing specific (arbitrary) still picture information.

C. "Silent cell" information is added in the cell type information, which enable the user to set a silent period.

D. The audio information is provided with "time map" information as in the case of the video information. Use of the time map information makes it possible to make time search for the audio information at any time (at any playback time).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram to help explain a recording format (a recording data structure) of audio information recorded on an information medium and a recording format (a recording data structure) of management information about the audio information;

DETAILED DESCRIPTION OF THE INVENTION

Figure 2:
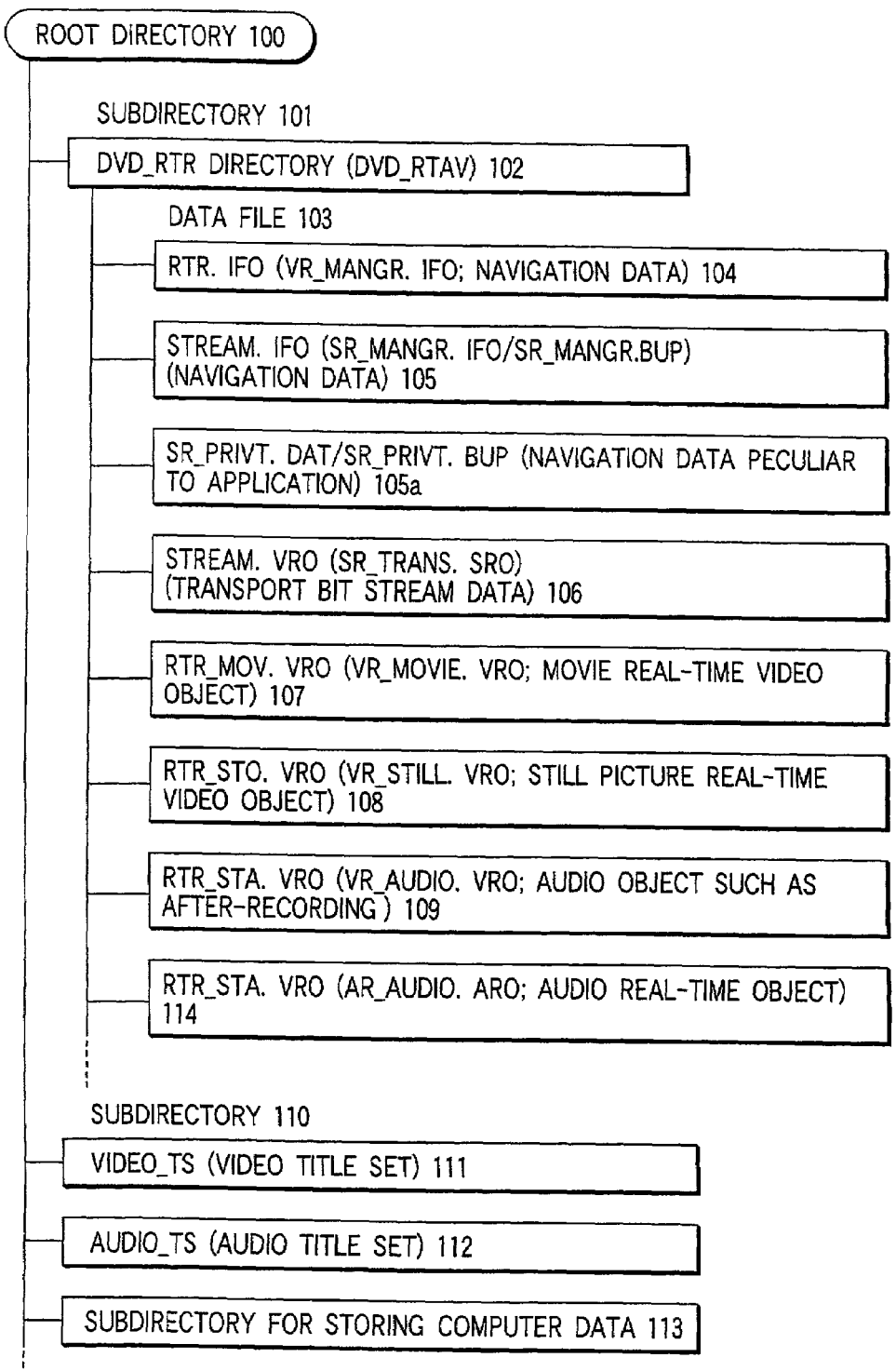
FIG. 2 is a diagram to help explain an example of the directory structure of a data file.

Hereinafter, referring to the accompanying drawings, an embodiment of the present invention will be explained. FIG. 1 illustrates the relationship between the individual information files and management information about them in an embodiment of the present invention.

As shown in FIG. 1(i), audio information is recorded in a file RTR_AUD.VRO (or AR_AUDIO.ARO) 114. Video information is recorded in a file RTR_MOV.VRO (or VR_MOVIE.VRO) 107 as shown in FIG. 1(o), and still picture information is recorded in a file RTR_VRO (or VR_STILL.VRO) 108 as shown in FIG. 1(l). Management information for managing integrally these types of information has been recorded in a navigation data file RTR.IFO (or AR_MANGR.IFO) 104 shown in (a) to (f) of FIG. 1.

All or part of the contents of the records of video information, still picture information, and audio information can be expressed in logical units called program chains (PGCs). The PGC is composed of one or more cells to be reproduced and program chain information (PGCI) in which its playback sequence and others have been written. On the other hand, a program (PG) is a logical unit obtained by dividing the contents of a PGC. One PGC can be divided into an integral number of PGs. One PG is composed of an integral number of cells.

When what has been described above is applied to the illustrations of (a) to (c) of FIG. 1, PGCI #1, the original PGC, is composed of an integral number of programs #α, #β, #γ, . . . . Program #α is composed of one cell #1 (movie cell) and program #β is made up of two cells #2 and #3 (audio cells). Program #γ is composed of three cells #4 (still picture cell), #5 (silent cell), and #6 (audio cell).

As shown in (c) and (d) of FIG. 1, movie cell #1 corresponds to movie VOB information M_VOBI•2. The M_VOBI has time map information (TMAPI) 10. Similarly, audio cells #2, #3, and #6 correspond to A_VOBI #A•4, A_VOBI #B•4, and A_VOBI #C•6. These A_VOBI (#A to #C) have time map information 12, 13, and 14, respectively. Still picture cell #4 corresponds to still picture VOB group information S_VOGI 3. The S_VOGI has VOB entry (S_VOB_ENT) 17.

Video information compressed in MPEG 2 constitutes a VOBU (video object unit) composed of one or more GOPs (group of pictures). The VOB is the smallest unit in video information access. A TV program or the like recorded (video-recorded/audio-recorded) generally constitutes, in the from of a block of video information, a M_VOB (movie video object) 31 composed of a plurality of VOBUs (VOBU No. 1, VOBU No. 2, VOBU No. 3, . . . in FIG. 1(m)) (FIG. 1(n)). In the RTR.IFO 104 in which management information has been recorded, M_VOBI (movie video object information) 2 in which information about each M_VOB has been written is present. Information called time map 10 is present for each M_VOBI.

As for still picture information, a still picture VOB 21 (FIG. 1(k)) is constructed for each still picture. Then, as shown in FIG. 1(j), the still picture itself has been recorded on a video part 22 and the audio information added to the still picture has been recorded on an audio part 23. Still picture video object group information (S_VOGI in FIG. 1(d)) 3 is formed for each group of one or more still pictures recorded on the video part 22. In a VOB entry (S_VOB_ENT) 17 included in the S_VOGI, information including the data size of each still picture has been recorded.

In a RTR_AUD.VRO 114 file (FIG. 1(*i*)) in which audio information has been recorded, recording information is divided and recorded in the form of individual audio video objects A_VOBs (or audio objects AOBs) for each title (each piece of music in recording) or for the timing of each recording session (#A to #C in FIG. 1(*h*)).

Information about each A_VOB (or AOB) is recorded in audio video object information A_VOBI (or audio object information AOBI). The audio information recorded on the information medium is divided into a plurality of audio frames or into audio entries at specific time intervals in video-recording, such as 1-second intervals, 2-second intervals, or 5-second intervals.

Information about time maps 12 to 14 in FIG. 1(*d*) has been recorded in each A_VOBI (#A to #C) in such a manner that the information relates to individual audio entries No. 1 to No. 5 (or time search table entries TMSRT_entry #1 to TMSRT_entry #5) in FIG. 1(*g*). In other words, in the embodiment of FIG. 1(*g*), the audio information has been recorded audio entry by audio entry (or time table entry by time table entry).

In the embodiment of FIG. 1, as with the video information (movie VOB 31 in FIG. 1(*n*)) in the existing RTR standard, cells #2, #3, and #6 have been defined which specify the playback range from the start position to the end position for the individual audio VOBs (AOBs) #A to #C. This enables the audio information (audio VOB #A to VOB #C) to be handled in totally the same manner as cell #1 that has specified the playback range from the start position to end position of video information (movie VOB 31) or cell #4 that has specified the playback range from the start position to end position of still picture information (still picture VOB 21). This is one of the characteristics of the present invention.

It is safe to say that the original PGC is information indicating the procedure for reproducing all the AV information recorded on an information medium as if the medium were a single tape. The playback sequence information has been written in program chain information (PGCI #1) shown in FIG. 1(*a*). The contents of the information in PGCI #1 indicate the order in which cells are arranged as shown in FIG. 1(*c*). To reproduce the original PGC, the cells arranged in FIG. 1(*c*) are reproduced in sequence from the left. In this way, use of the PGCI information clarifies the connection (the playback sequence) between video information, still picture information, and audio information.

In the embodiment, PGCI #1 of FIG. 1(*a*) is defined as the only original PGC in RTR.IFO (or AR_MANGR.IFO) 104. An n number (an integral number) of PGCI #n that the user has determined arbitrarily are defined as user-defined PGCs (FIG. 1(*f*)). The number of user-defined PGCs may be more than one. The playback sequence of them can be expressed by the order in which cells #11 to #13 are arranged in FIG. 1(*e*). The cells #11 to #13 present under the user-defined PGC can be set to specify any range in each VOB by making use of the time maps 10 to 14, as the need arises.

In other words, In A_VOBI #A4 to A_VOBI #C6, management information about audio information, the time maps 12 to 14 of FIG. 1(*d*) are provided. The cells #11 to #13 present under the user-defined PGC can specify the playback range (specify the time) using the information in the time maps 12 to 14.

In the embodiment, cell type information is given to the cell information corresponding to each cell as shown in FIG. 1(*c*), thereby making it possible to distinguish between video information (movie cells), still picture information (still picture cells), and audio information (audio cells).

The correspondence between the video information (movie cells), still picture information (still picture cells), audio information (audio cells), and audio+video or still picture information (composite cells) and the cell types (three bits) can be set as follows: for example, movie cell: cell type="000"
still picture cell: cell type="001"
audio cell: cell type="010"
composite cell: cell type="011"

The above cell types are illustrative and not restrictive. For instance, the cell type of audio cells (as long as it is not confused with the other cell types) may be any one of "000" to "111."

FIG. 2 is a diagram to help explain the directory structure of a data file according to an embodiment of the present invention. The information recorded on an information medium, such as a DVD-RAM disc has a hierarchical file structure for each piece of information. The audio information and others explained in the embodiment are included in a subdirectory 101 named DVD_RTR directory (or DVD_RTAV) 102.

In the DVD_RTR (DVD_RTAV) directory 102, a data file 103 with the following contents is stored. Specifically, as a group of management information (navigation data), RTR.IFO (or VR_MANGR.IFO) 104, STREAM.IFO (SR_MANGR.IFO/SR_MANGR.BUP) 105, and SR_PRIVT.DAT/SR_PRIVT.BUP 105*a* are stored. Moreover, as the content of the data (content information), STREAM.VRO (or SR_TRANS.SRO) 106, RTR_MOV.VRO (VR_MOVIE.VRO) 107, RTR_STO.VRO (or VR_STILL.VRO) 108, and RTR_STA.VRO (or VR_AUDIO.VRO) 109 are stored.

In the root directory 100 at a higher level of hierarchy than that of the subdirectory 101 including the data file 103, a subdirectory 110 for storing other pieces of information can be provided. The contents of the subdirectory include a video title set VIDEO_TS 111 in which video programs have been stored, an audio title set AUDIO_TS 112 in which audio programs have been stored, and a subdirectory 113 for storing computer data.

The data transmitted in the form of a packet structure over a cable or radio data communication path is recorded on an information medium, with the packet structure remaining unchanged. The resulting data is called "stream data."

The stream data itself is recorded under the file name STREAM.VRO (or SR_TRANS.SRO) 106. A file in which management information about the stream data has been recorded is STREAM.IFO (or SR_MANGR.IFO and its backup file SR_MANGR.BUP) 105.

Furthermore, a file in which analog video information handled by VCR (VTR) or conventional TV and digital-compressed according to the MPEG 2 standard has been recorded is RTR_MOV.VRO (or VR_MOVIE.VRO) 107. A file in which still picture information including postrecording sound or background music has been put together is RTR_STO.VRO (or VR_STILL.VRO) 108. Its after-recording audio information file is RTR_STA.VRO (or VR_AUDIO.VRO) 109. Moreover, in the directory structure of FIG. 2, all the audio information has been recorded in a single file named audio real-time video object RTR_AUD.VRO (or VR_AUDIO.VRO) 114.

The directory structure of FIG. 2 is illustrative and all the audio information may be recorded in the RTR_STA.VRO 109 file in which the after-recording audio information has been recorded or in the audio part (FIG. 1(j)) of RTR_STO.VRO 108 in which the still picture information has been recorded.

Figure 3:
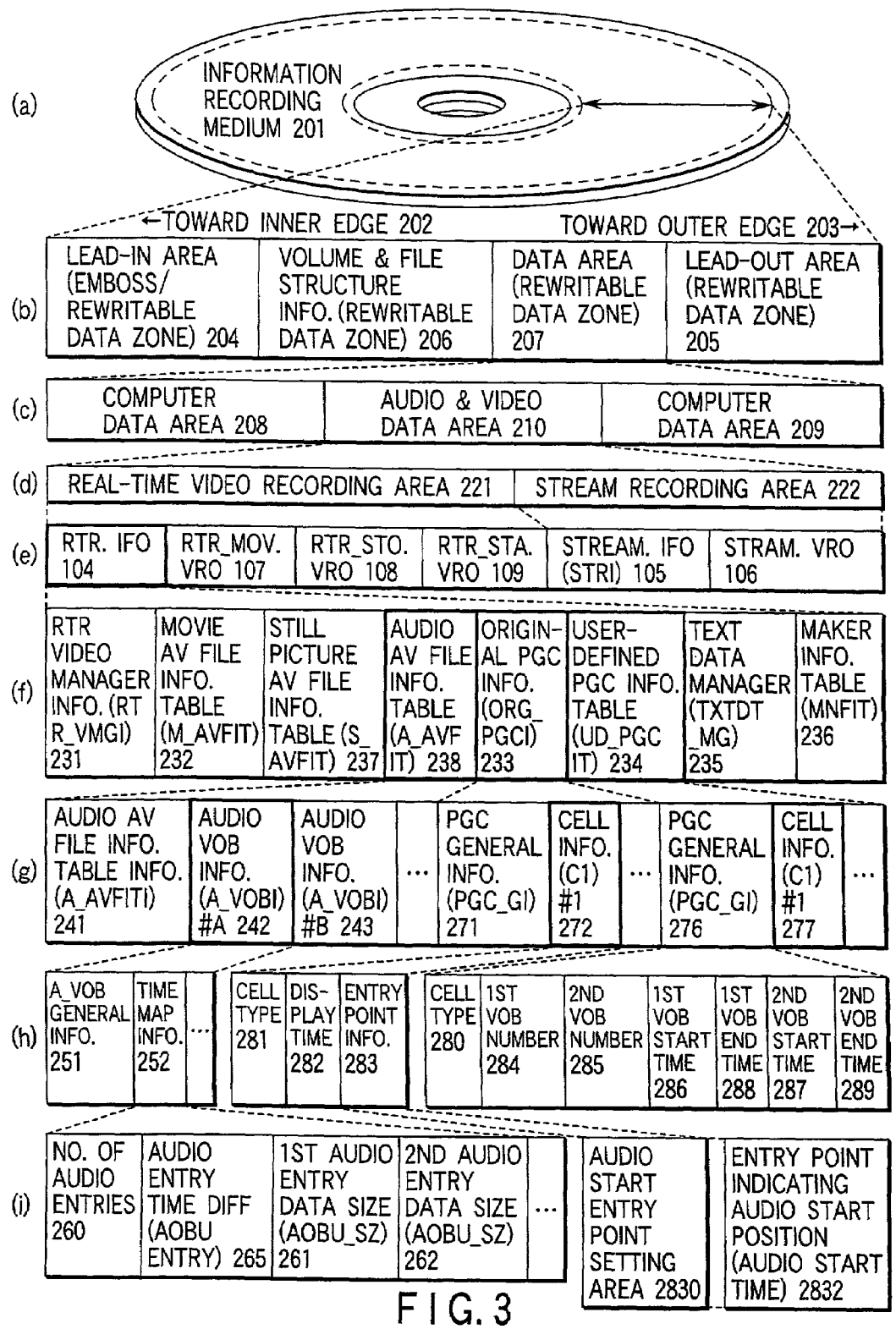
FIG. 3 is a diagram to help explain an example of the recording data structure on a recordable/reproducible information medium.

FIG. 3 illustrates the recording layout and position of each file on an information medium shown in FIG. 2. As shown in FIG. 3(b), a lead-in area 204 and a lead-out area 205 are provided on the inner edge part and outer edge part of an information medium 201 of FIG. 3(a). User data is recorded in the area sandwiched between the lead-in area and lead-out area. When a DVD-RAM disc is used as the information medium 201, UDF (universal disc format) is used for the file system. General information on the UDF is recorded in volume & file structure information 206 and user information is recorded in the remaining part of the medium, a data area 207.

As shown in FIG. 3(c), in the embodiment, computer data areas 208 and 209 and an audio & video data area 210 can be recorded in a mixed manner.

As shown in FIG. 3(d), in the audio & video data area 210, a real-time video recording area 221 in which the inputted analog video information and/or audio information are digital-recorded and a stream recording area 222 in which digital-TV received images are recorded can be provided. In the above individual areas (208 to 209), the files shown in FIG. 2 have been recorded in the form of FIG. 3.

Management information about all the AV information including video information, still picture information, and audio information is all recorded in the same file named RTR.IFO 104 in FIG. 3(e) and is under common management.

In the RTR.IFO 104, the various types of information shown in FIG. 3(f) have been recorded. Specifically, in the RTR.IFO 104, the following are recorded: RTR video manager information (RTR_VMGI) 231, a movie AV file information table (M_AVFIT) 232, a still-picture AV file information table (S_AVFIT) 237, an audio AV file information table (A_AVFIT) 238, original PGC information (ORG_PGCI) 233, a user-defined PGC information table (UD_PGCIT) 234, a text data manager (TXTDR_MG) 235, and a maker (or manufacturer) information table (MNFIT) 236.

Although not shown, the still-picture AV file information table (S_AVFIT) 237 can include still-picture additional audio file information (S_AAFI) and the S_AAFI can include one or more pieces of still-picture additional audio group information (S_AAGI #1 to S_AAGI #n). Each S_AAGI can include still-picture additional audio group general information (S_AAG_GI) and one or more additional audio entries (AA_ENT #1 to AA_ENT #n).

Here, S_AAG_GI is composed of the number of additional audio entries (AA_ENT_Ns), still-picture additional audio stream information number (S_AA_STIN), and the start address (S_AAG_SG) of the relevant additional audio group in a still-picture additional audio file.

Furthermore, each AA_ENT is composed of additional audio type (AA_TY), additional audio part size (AA_PART_SZ), the playback time of additional audio part (AA_PART_PB_TM). In the additional audio type (AA_TY), a 1-bit flag indicating whether the relevant additional audio is in the normal state (AA_TY="0") or the temporarily erased state (AA_TY="1") is stored.

All the management information about the audio information has been recorded in the audio AV file information table 238 of FIG. 3(f). FIG. 3(g) shows an example of the contents of the records in the audio AV file information table 238, original PGC information (ORG_PGCI) 233, and user-defined PGC information table (UD_PGCIT) 234.

Audio VOB information (A_VOBI #A) 242 of FIG. 3(g) corresponds to A_VOBI #A of FIG. 1(d) and audio VOB information (A_VOBI #B) 243 of FIG. 3(g) corresponds to A_VOBI #B of FIG. 1(d). In addition, PGCI #1 (original PGC) of FIG. 1(a) corresponds to the original PGC information (ORG_PGCI) 233 of FIG. 3(f). The user-defined PGC (PGCI #n) of FIG. 1(f) means the user-defined PGC information table (UD_PGCIT) 234 of FIG. 3(f). Moreover, the information in each of the time maps 12, 13, 14 shown in FIG. 1(d) is recorded in time map information 252 of FIG. 3(h). The detailed structure of the time map information is as shown in FIG. 3(i).

Most pieces of the audio information have the smallest units called audio frames. In the embodiment, a plurality of audio frames are put together to form a unit called an audio entry. Information management is performed audio entry by audio entry on the time map information 252.

In the method of forming an audio entry, audio information may be put together at specific time intervals, such as 1-second intervals, 2-second intervals, or 5-second intervals, to form an audio entry, instead of putting a plurality of audio frames together as described above. The time interval information for putting audio entries together can be given to audio entry time difference 265 of FIG. 3(i).

The audio information (music programs) is put together piece by piece of music or title by title to form an audio VOB (AOB). The number of entries included in each audio VOB is recorded in the number of audio entries 260. For the audio information recorded in the RTR_AUD.VRO 114 file, the recording size of each audio entry included in each audio VOB can be recorded in a first audio entry data size 261, a second audio entry data size 262, . . . .

The number of audio entries 260 can have the contents corresponding to the AA_ENT_Ns in the S_AVFIT 237 or TMSRTE_Ns explained later by reference to FIG. 5. In addition, each of the audio entry data sizes 261, 262, and the like can have the contents corresponding to the AA_PART_SZ in the S_AVFIT 237 or TMSRT_entry explained later by reference to FIG. 5.

When the user or the like specifies the playback time in an audio VOB (AOB), a check is made for the specified time to see which one in the order of the audio entries includes the audio information specified by the user or the like. Then, the first audio entry data size 261, second audio entry data size 262, . . . data size are added (accumulated), thereby calculating the position (the address corresponding to the playback start time) where the specified audio information on the information medium 201 is recorded.

While in the data structure of the time map information 252 shown in (h) and (i) of FIG. 3, the data size of each audio entry has been recorded, this is not restrictive and the accumulation position (address) information at the begin position of each audio entry may be given to the time map information 252.

Furthermore, in the embodiment of FIG. 1(g), the audio information has been put together and recorded audio entry by audio entry. In another embodiment of the present invention, there is provided a method of recording the audio information continuously instead of recording the audio information in blocks as shown in FIG. 1(g). In this case, instead of having the time map information 252 information, entry point information 283 shown in FIG. 3(h) is used.

Specifically, a data structure similar to that of the time map information of FIG. 3(i) is given to an audio start entry point setting area 2830 in the entry point information 283, thereby enabling the positions (addresses) in which the audio information (which can include silence information)

has been recorded at specific time intervals, such as 1-second intervals or 2-second intervals, to be recorded one after another as entry points 2832 indicating the audio start positions.

Furthermore, time interval information similar to the audio entry time difference 265 and/or the number of entry points similar to the number of audio entries 260 can be recorded in the entry point information 283. A method of calculating the access point on the information medium 201 for the audio playback start time specified by the user may be similar to the method used with the aforementioned time map information 252.

There are two types of cells in an audio-only object (audio-only title audio object AOTT_AOB): one is an audio cell and the other is a silent cell. An audio cell is composed of only audio data or of audio data and real-time information data. The playback time of an audio cell is set to one second or longer. On the other hand, a silent cell is composed of only audio data for a silent period. The playback time of a silent cell is set to 0.5 second or longer.

In audio information (particularly, a music album including a plurality of pieces of music), the silent time between pieces of music is important during playback. In the embodiment of the present invention, use of the silent cells makes it easy to set silent time information.

For example, cell #5 shown in FIG. 1(*c*) has no corresponding silence information and is specified to be a silent cell in terms of cell type. Information about each cell type of FIG. 1(*c*) is recorded in the areas for the cell types 280, 281 shown in FIG. 3(*h*). As shown in FIG. 3(*h*), the structure is such that information on display time 282 can be recorded as information in the original cell information 272. The silent period for the cell for which a silent cell has been specified can be set in the display time 282 information.

In the cell types 280, 281 shown in FIG. 3(*h*), identification information (identification flag composed of a plurality of bits) for identifying the following can be written: video information (RTR_MOV.VRO/VR_MOVIE.VRO), still picture information (RTR_STO.VRO/VR_STILL.VRO/AR_STILL.ARO), text information (AR_RT_TEXT.ARO), stream information (STREARM.VRO/SR_TRANS.SRO), audio information (RTR_STA.VRO/VR_AUDIO.VRO/RTR_AUD.VRO/AR_AUDIO.ARO) and others.

The method of setting a silent period is as follows. In the entry point information 283 of FIG. 3(*h*), the setting area 2830 for an audio start entry point is provided. In the embodiment, audio information including a silent period in advance has been recorded in the audio VOB (AOB) of FIG. 1(*h*). The position at which a silent period ends and sound starts can be recorded as time information in the audio start entry point 2832. When the user or the like wants to skip the silent period and start the playback directly from the audio start position, the information medium 201 has only to be accessed using the audio start entry point information.

An embodiment of the present invention employs such a data structure as enables the already recorded audio information and still picture information or the already recorded video information and the audio information recorded at a different time to be reproduced simultaneously using the user-defined PGC 8 of FIG. 1(*f*).

Specifically, as shown in FIG. 1(*e*), when a composite cell has been specified for a cell type, the simultaneous playback of two types of information is specified. To realize the simultaneous playback, the data structure of the user-defined cell information 277 not only enables two VOB numbers 284, 285 to be specified independently but also has VOB start times 286, 287, the playback start times of the respective VOBs, and information about VOB end times 288, 289, the playback end times, as cell information.

Figure 4:
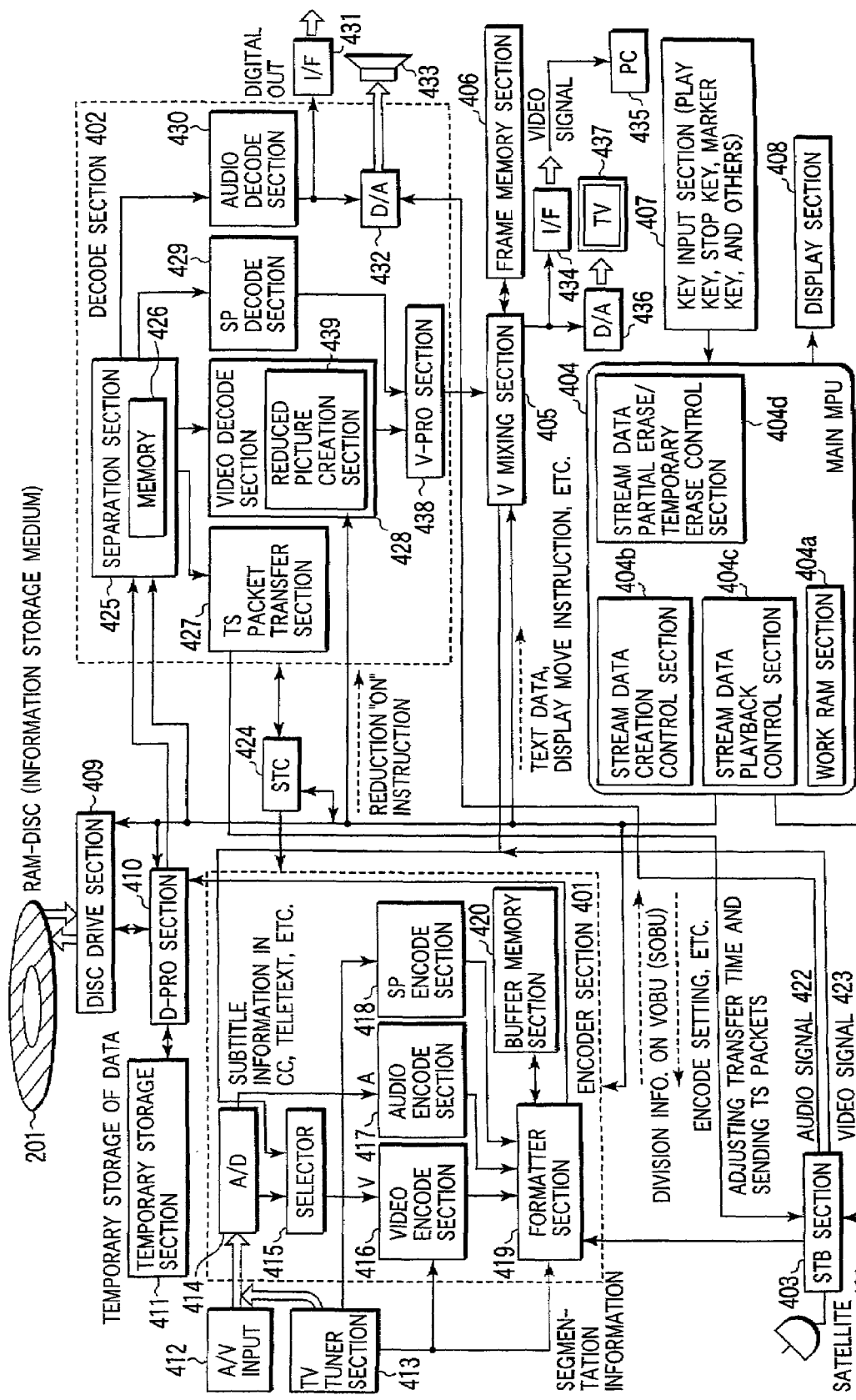
FIG. 4 is a diagram to help explain the configuration of a recording and reproducing apparatus according to an embodiment of the present invention.

FIG. 4 is a diagram to help explain the configuration of an audio information recording/reproducing apparatus (an RTR video recorder and/or streamer with an expanded audio recording/reproducing function) according to an embodiment of the present invention. Hereinafter, using FIG. 4, the internal structure of the audio information recording/reproducing apparatus will be explained as a preferred embodiment of the present invention.

The audio information recording/reproducing apparatus of the present embodiment comprises an encoder section 401, a decoder section 402, an STB section 403, a main MPU section 404, a V (video) mixing section 405, a frame memory section 406, a key input section 407, a display section 408, a disc drive section 409 for recording or reproducing information onto or from a DVD-RAM disc 201, a data processor (D-PRO) section 410, a temporary storage section 411, an A/V (audio/video) input section 412, and a TV tuner section 413. The audio information recording/reproducing apparatus further comprises a satellite antenna 421 connected to the STB section 403, a system time counter (STC) section 424, an interface (I/F) 434 for sending a digital video signal from the V mixing section 405 to a personal computer (PC) 435, and a D/A conversion section 436 for an analog TV 437.

The V mixing section 405 has the function of mixing the digital video signal from the V-PRO section 438 of the decode section 402 with the digital video signal 423 from the STB section 403, as the need arises. The mixing function makes it possible to display not only the broadcast image from the STB section 403 on the left side of the display screen of the TV 437 but also the image reproduced from the disc 201 on the right side of the display screen of the TV 437. Alternatively, the mixing function makes it possible to display the broadcast image from the STB section 403 and the image reproduced from the disc 201 on the monitor screen of the PC 435 in such a manner that they are superimposed one on top of the other on an overlapping window.

With the above configuration, the encoder section 401 is composed of a video and audio A/D conversion section 414, a selector 415 for choosing between the digital video signal from the A/D conversion section 414 and the digital video signal 423 from the STB section 03 and sending the selected signal to a video encode section 416, the video encode section 416 for encoding the video signal from the selector 415, an audio encode section 417 for encoding the audio signal from the A/D conversion section 414, an SP encode section 418 for encoding the closed caption (CC) signal from the TV tuner section 413 or a broadcast signal or the like into sub-pictures (SP), a formatter section 419, and a buffer memory section 420.

On the other hand, the decode section 402 is composed of a separation section 425 containing a memory 426, a video decode section 428 containing a reduced picture (thumbnail picture) creation section 439, an SP decode section 429, an audio decode section 430, a transport stream packet (TS packet) transfer section 427, a video processor (V-PRO) section 438, and an audio D/A conversion section 432.

The digital audio signal decoded at the decode section 430 can be outputted to the outside world via an interface (I/F) 431. The digital audio signal is converted by the D/A conversion section 432 into an analog audio signal, which passes through an external audio amplifier (not shown) and drives a speaker 433. The D/A conversion section is designed to be capable of perform D/A conversion of not only the digital audio signal from the audio decode section 430 but also the digital audio signal 422 from the STB section 403.

When the playback data from the disc 201 is transferred to the STB section 403, the TS packet transfer section 427 has only to change the playback data (bit stream) from the separation section 425 into transport packets (TS packets) and send the TS packets to the STB section 403 in such a manner that the transfer time is adjusted to the time information from the STC 424.

The main MPU section 404 of FIG. 4 includes a work RAM 404a acting as a work memory, a control program named a stream data (or RTR data) creation control section 404b, a control program named a stream data (or RTR data) playback control section 404c, and a control program named a stream data (or RTR data) partial erase/temporary erase control section 404d.

To read and write data from and into the management area (RTR.IFO 104 or STREAM.IFO 105 in FIG. 2 or FIG. 3(e)) of a file, the main MPU section 404 is connected to the D-PRO section 410 via a dedicated microcomputer bus.

In the audio information recording/reproducing apparatus, control in recording (audio-recording and video-recording) is performed by the main MPU section 404 using the control program (sequential control program). First, the flow of the video signal in recording (audio-recording and video-recording) in the apparatus of FIG. 4 will be explained. In video-recording, a series of processes is carried out according to the sequential program named the stream data (or RTR data) creation control section 404b in the main MPU section 404.

Specifically, the stream data (or RTR data) sent from the STB section 403 to the encode section 401 by way of a transmission path complying with the IEEE 1394 standard is first transferred to the formatter section 419. The IEEE 1394 reception side of the formatter section 419 reads the time from the stream data (or RTR data) transfer start on the basis of the time count value in STC 424. The read-in time information is sent as management information to the main MPU section 404, which stores the information in the work RAM section 404a.

The main MPU section 404, on the basis of the time information, creates division information for segmenting the stream data (or RTR data) stream block by stream block (VOBU by VOBU in a real-time RTR recorder or SOBU by SOBU in a streamer). The main MPU section 404 further creates cell segmentation information, program segmentation information, and PGC segmentation information corresponding to the division information and records the resulting pieces of information in the work RAM section 404a in the main MPU section 404 one after another.

The formatter section 419 converts the stream data (or RTR data) sent from the STB section 403 into pack trains according to instructions from the stream data (or RTR data) creation control section 404b in the main MPU section 404 and inputs the converted pack trains to the D-PRO section 410. Each inputted pack has a constant size of 2048 bytes as a sector has. The D-PRO section 410 puts the inputted packs together in units of 16 sectors to form ECC blocks and sends the ECC blocks to the disc drive section 409.

When the disc drive section 409 is not ready to record data on the RAM disc (information medium) 201, the D-PRO section 410 transfers the recording data to the temporary storage section 411, which stores the data temporarily. The D-PRO section 410 waits for the disc drive section 409 to be ready for data recording. Here, the temporary storage section 411 is assumed to have a large capacity memory to enable high-speed access and the storage of more than several minutes of recording data.

After the disc drive section 409 is ready for recording, the D-PRO section 410 transfers the data stored in the temporary storage section 411 to the disc drive section 409. This starts to record the data onto the disc 201. After the data stored in the temporary storage section 411 has been recorded, the formatter section 419 transfers the rest of the data seamlessly to the D-PRO section 410.

Next, data processing in playback will be explained. In control during playback in the audio information recording/reproducing apparatus, the main MPU section 404 carries out a series of processes according to the sequential program named the stream data (or RTR data) playback control section 404c.

First, the disc drive section 409 reproduces the stream data (or RTR data) from the RAM disc (information medium) 201. The reproduced data is transferred to the decoder section 402 by way of the D-PRO section 409. In the decoder section 402, the separation section 425 receives the packets in the reproduced data.

The separation section 425 transfers the video packet data (MPEG video data) to the video decode section 428, the audio packet data to the audio decode section 430, and the sup-picture packet data to the SP decode section 429.

The video data decoded at the video decode section 428 passes through the V mixing section 405 and D/A conversion section 436, which convert the decoded video data into an analog TV signal. The analog TV signal is transferred to the TV 437, which displays an image from the analog TV signal.

At the same time, the audio signal decoded at the audio decode section 430 is sent to the D/A conversion section 432, which converts the decoded audio signal into digital audio data. The converted digital audio data is transferred via the I/F 431 to the digital input of an external audio apparatus (not shown). Alternatively, the converted digital audio data is converted by the D/A conversion section 432 into an analog audio signal and sent to the speaker 433 via an audio amplifier (not shown).

In the audio information recording/reproducing apparatus of FIG. 4, the A/V input section 412 inputs the audio information. After the A/D converter 414 converts the audio information into a digital signal, the digital signal is inputted to the audio encode section 417 by way of the selector 415. In a first step of recording, the inputted audio information is recorded additionally in the RTR_AUD.VRO 114 file on the information medium 201. Simultaneously with the recording, the main MPU section 404 creates management information about the recorded audio information in real time. After the audio information has been recorded, cell information and/or PGCI information as shown in FIG. 3 are changed or created additionally. Thereafter, RTR_IFO 104 is rewritten on the basis of the management information including the changed or additionally created cell information and/or PGCI information.

Figure 5:
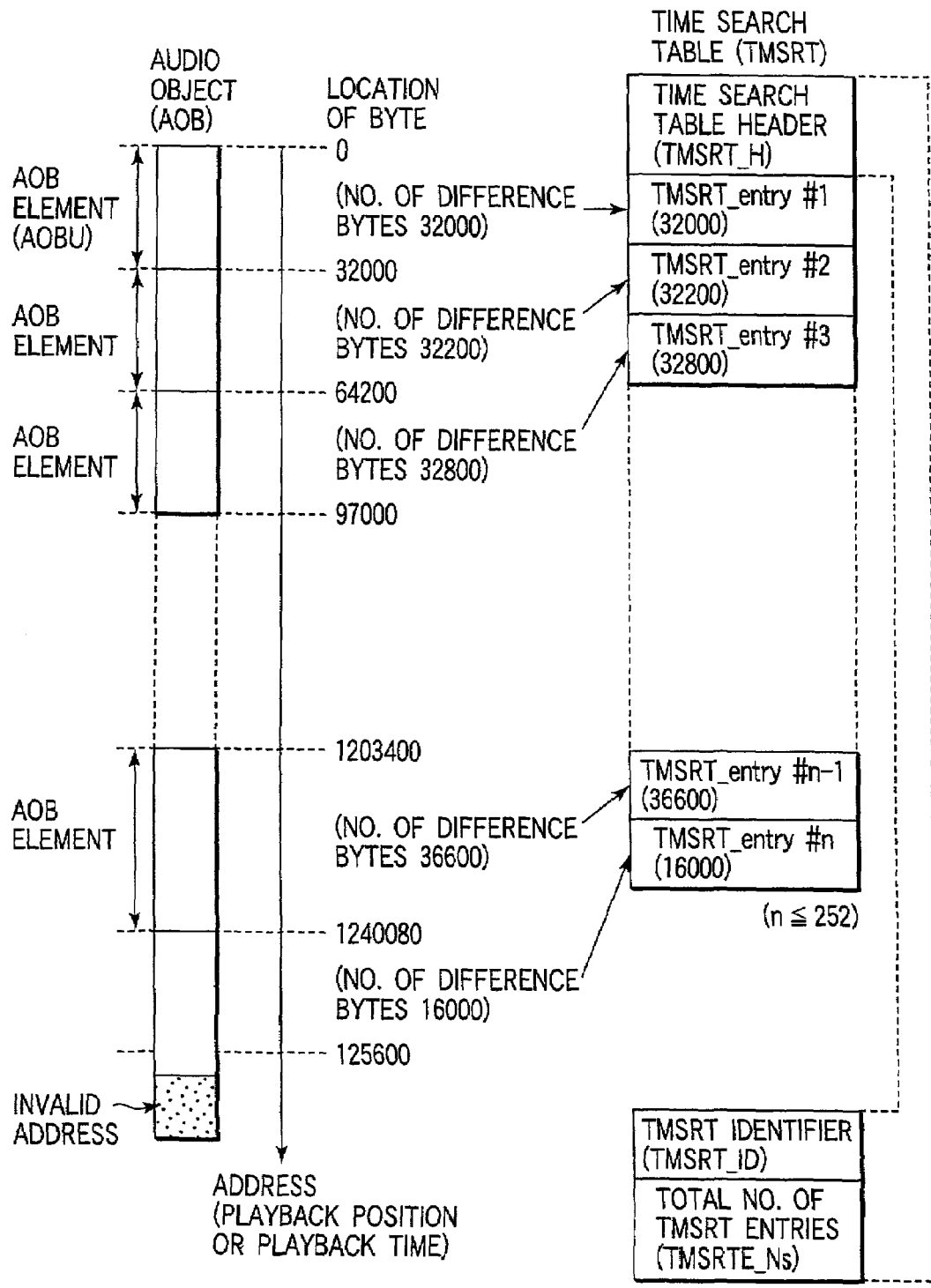
FIG. 5 is a diagram to help explain the relationship between the data structure of a time search table for storing the time search table entries corresponding to the audio entries of FIG. 1 and the addresses (playback positions or playback times) of the audio objects (AOBs), the contents of the recorded audio information.

FIG. 5 shows the relationship between the data structure of the time search table for storing the time search table entries corresponding to the audio entries of FIG. 1 and the addresses (playback positions or playback times) of the audio objects (AOB), the contents of the recorded audio information.

An audio object AOB (or audio VOB) is composed of a collection of AOB elements (or audio object units AOBUs) of a specific data size. The addresses (playback positions or playback times) of these AOB elements can be expressed by the values obtained by accumulating the data sizes of a series of AOB elements.

The data size of each AOB element can be expressed by the number of difference bytes written in the corresponding time search table entry (TMSRT_entry #1 to TMSRT_entry #n). These TMSRT entries (TMSRT_entry #1 to TMSRT entry #n) and time search table header (TMSRT_H) are put together into the time search table (TMSRT).

Specifically, the time search table TMSRT is made up of one or more TMSRT elements (#1 to #n), which are not only information indicating the sizes of the AOB elements in an AOB but also management information for the time search table header TMSRT_H and each AOB element.

The header TMSRT_H in the time search table TMSRT is made up of an identifier TMSRT_ID for TMSRT, the total number of TMSRT entries TMSRTE_Ns, and others. The TMSRTE_Ns corresponds to the number of audio entries 260 in FIG. 3(i).

Each of the TMSRT entries (TMSRT_entry #1 to TMSRT_entry #n) includes TMSRT_ENT indicating the data size of the corresponding AOB entry in the number of bytes. The TMSRT_ENT corresponds to the audio entry data sizes 261, 262 in FIG. 3(i).

In the embodiment, the data size (the number of bytes) written in the time search table TMSRT corresponds to playback time at 2-second intervals.

Figure 6:
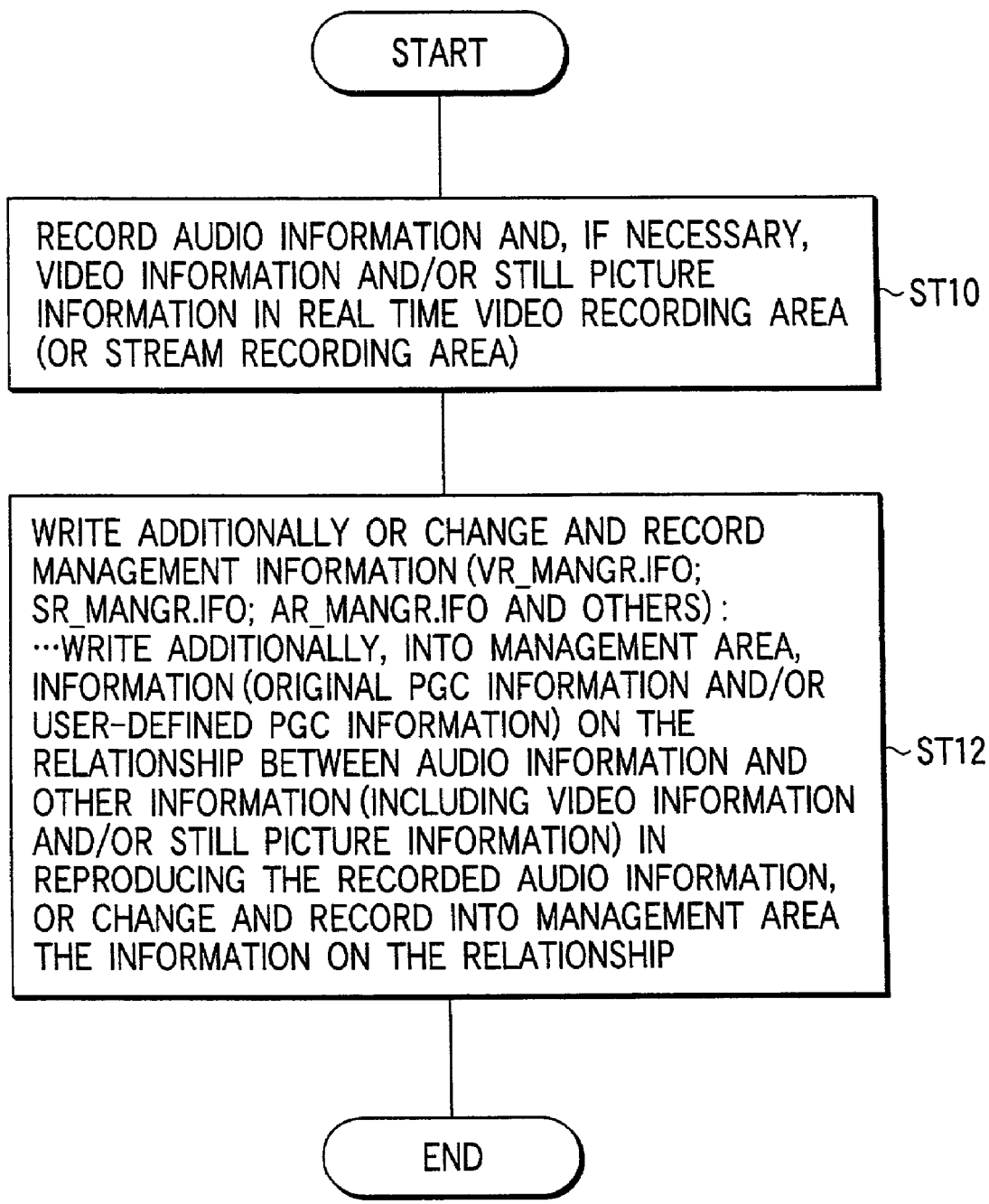
FIG. 6 is a flowchart to help explain an example of the procedure for recording information according to the present invention.

FIG. 6 is a flowchart to help explain an example of the procedure for recording information according to the present invention. The procedure can be executed on, for example, the main MPU 404 of FIG. 4. In recording, for example, the medium 201 of FIG. 3 can be used.

The RTR data or stream data suitably including video information, still picture information, text information, stream information and/or audio information is recorded in the real-time video recording area 221 or the stream recording area 222 of FIG. 3(d) (step ST10). In the embodiment, it is assumed that, at step ST10, audio information and other types of information (video information, still picture information, text information, and stream information) are recorded in a mixed manner. Recording information in step ST10 includes not only a case where new video-recording is done but also a case where part of the record is erased in editing or a case where the record is rewritten by overwriting an erasable part.

After information recording (including partial erasing and rewriting) at step ST10 has been completed, the management information (RTR.IFO/VR_MANGR.IFO in FIGS. 1 to 3; STREAM.IFO/SR_MANGR.IFO in FIGS. 2 and 3; or AR_MANGR.IFO in FIG. 7) is written additionally to the management area or is changed and recorded (rewritten) in the management area according to the recording (partial erasing and rewriting) (step ST12).

Specifically, information (original PGC information and/or user-defined PGC information) about the relationship between the audio information and the other information (information including video information, still picture information, text information, and stream information) in reproducing the recorded audio information is written additionally or changed and recorded in the management area.

Figure 7:
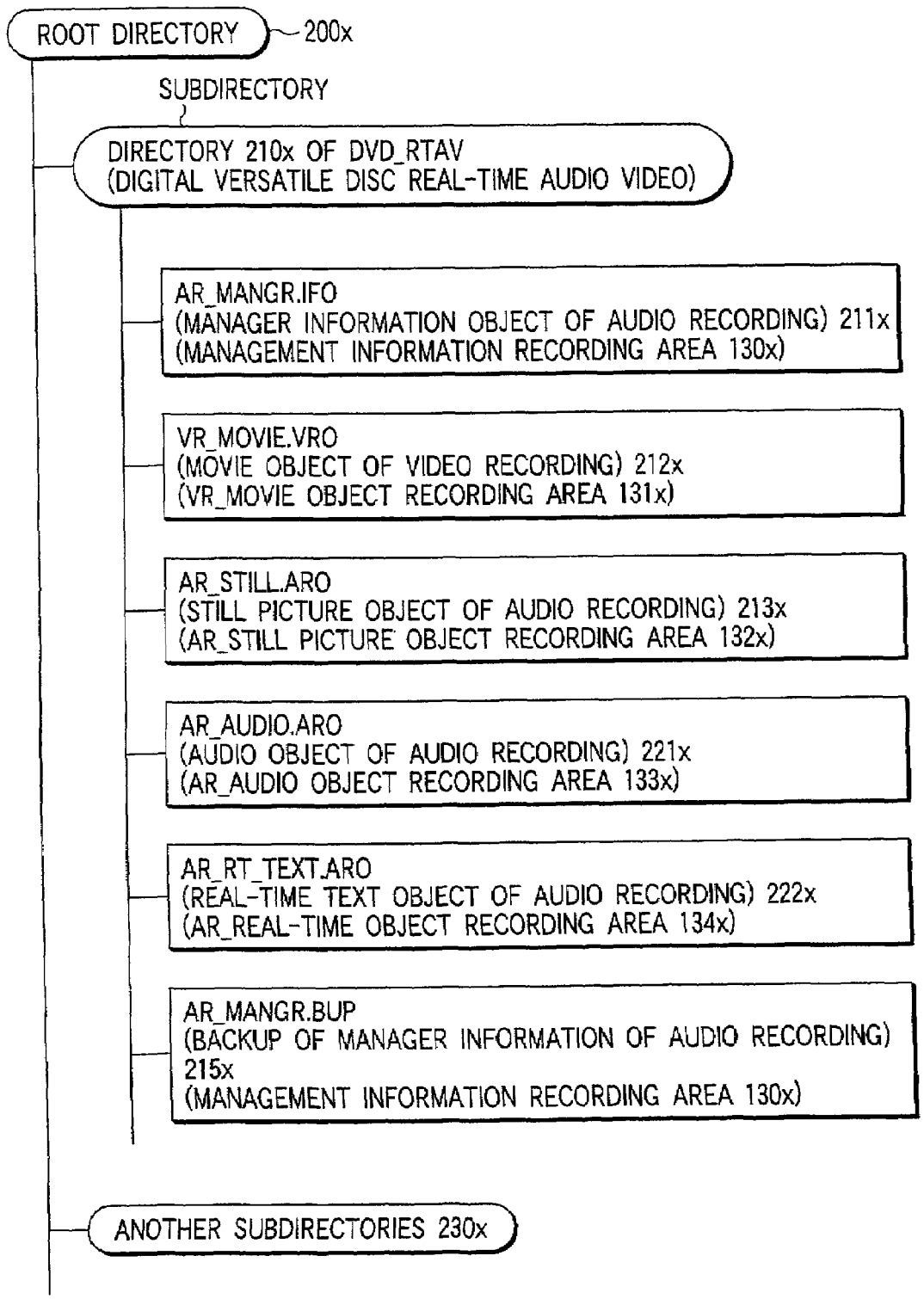
FIG. 7 is a diagram to help explain another example of the directory structure of a data file.

FIG. 7 is a diagram to help explain another example of the directory structure of a data file. In the root directory 200X, DVD_RTAV directory 210X serving as a subdirectory and another subdirectory are provided as the need arises. In the subdirectory 210X, information about each object (content information) is recorded in an independent file for the contents of each object.

Content information about audio and video is called an object. As shown in FIG. 7, video content information is recorded in a VR_movie object recording area 131X and audio content information is recorded in an AR_audio object recording area 133X. Moreover, content information about still pictures is recorded in an AR_still picture object recording area 132X and content information about real-time text is recorded in an AR_real-time text object recording area 134X. All the audio information is recorded in a file named AR_AUDIO.ARO 221X, all the still picture information (still picture) is recorded in a file named AR_STILL.ARO 213X, and all the real-time text information is recorded in a file named AR_RT_TEXT.ARO 222X.

In an embodiment of the present invention, a scene of pictures in a video information file defined according to the video recording standard can be extracted as a still picture. The extracted still picture can be displayed simultaneously with the audio information. An video information file VR_MOVIE.VRO 212X used at that time is also recorded in the same DVD_RTAV directory 210X. The information in a management information recording area 130X for managing these object files comprehensively is recorded in a file named AR_MANGR.IFO 211X and its backup file AR_MANGR.BUP 215X.

The frame of the data structure of the management information recorded on an information medium on or from which audio-related information can be recorded or reproduced is designed to have the same structure as that in the video recording standard determined in a DVD forum from the viewpoint of the importance of interchangeability. As in the video recording standard determined in a DVD forum, the information indicating the procedure for reproducing the audio-related information has been recorded in the original PGC information/user-defined PGC information.

The smallest basic unit capable of continues playback in the audio-related information is called a cell. The playback procedure showing the connection of the cells is composed of PGC. All the management information about cells is recorded in one or more pieces of cell information recorded in the management information recording area 130X. Information indicating what part of the file AR_AUDIO.ARO 221X in which the audio information has been recorded is reproduced in one cell has been recorded in the cell information. The procedure for reproducing the audio-related information according to one piece of PGC information is determined by the order of arrangement of one or more pieces of cell information constituting the PGC information. Playback and display are executed in the order of the arrangement.

Playback procedure information about the audio-related information includes the following two playback procedures:

(1) A playback procedure for reproducing the data in the order in which the data has been recorded on the information medium.

(2) A playback procedure that the user can specify arbitrarily.

Management information about the playback procedure for "reproducing the data in the order in which data has been recorded" is called "original PGC" and can be named "original track" by the user. Management information about the playback procedure "the user can specify arbitrary" is called "user-defined PGC" and can be named "play list" by the user.

Although one information medium can have only one original PGC, more than one user-defined PGC can be set in one information medium. Management information about each user-defined PGC is recorded in a plurality of pieces of user-defined PGC information (FIG. 3(*f*)). These pieces of user-defined PGC information are managed centrally in the user-defined PGC information table (UD_PGCITI). Specifically, the UD_PGCITI shows what user-defined PGC information has been recorded in this table. Information for searching for these pieces of user-defined PGC information can be recorded in the management information as user-defined PGC information search pointers.

Such an audio information medium as a CD (compact disc), an MD (minidisc), or a cassette tape has a management unit called "track" set for each piece of popular music or for each piece of classical music. When the play list (user-defined PGC) is created, for example, the user may combine part of the original track named "A" with part of the original track named "B" to create a new track named "C."

A single cell can specify only a continuous playback range in AR_AUDIO.ARO 221X, an audio information file (playback ranges that are consecutive but not continuous or are discrete in AR_AUDIO.ARO 221X cannot be specified). In this case, for example, part of the original file named "A" is specified in a single (user-defined) cell #1, part of the original file named "B" is specified in another single (user-defined) cell #2, a combination of cell #1 and cell #2 enables a new track named "C" to be defined and managed. Specifically, with the data structure related to an embodiment of the present invention, a combination of one or more cells can constitute one track.

To secure the compatibility with the video recording standard determined in a DVD forum, a method of determining the divisions of tracks peculiar to the audio information, while holding the data structure, is such that information indicating the positions of breaks in a track for audio information can be recorded in the PGC information, information indicating the playback procedure, in the embodiment of the present invention.

To realize this method, an information recording area called track head entry point is allowed to be set in the cell information, management information about the cell present in the playback start position of each track. In the track head entry point, information inherent to a track is recorded.

The type of the track entry point is track head entry point or program information.

The contents of the information in the entry point include entry point type information (identification information for discriminating between track head entry point, and still picture entry point), information for specifying the display range of the representative sound indicating the contents of the corresponding audio track (specified by the playback start time and playback end time in the corresponding audio track), and information for specifying the storage location of the representative image representing the contents of the corresponding audio track (specified by S_VOGI number and the VOB entry number in the location). In addition, the contents further include text information (primary text in which the names of pieces of music, the names of performers, the names of singers, the names of composers, and others have been written) inherent to the corresponding audio track, additional explanatory text information (item text), the display mode of a still picture in the corresponding audio track (the display sequence mode, display timing mode, and others), display time range information about the corresponding still picture, the relationship between the contents of the still picture to be displayed and the original track (whether the same still picture as that on the original track or another independent still picture (newly set still picture) is displayed), and an erase inhibit flag.

Furthermore, the still picture entry point includes entry point type information (identification information for discriminating between track head entry point and still picture entry point), information for specifying the storage location for a still picture to be displayed (specified by the S_VOGI number and the VOB entry number in the location), information for specifying the timing for displaying the still picture (information for specifying display time information about the corresponding audio object to adjust the display timing between them), and the display time range information about the corresponding still picture. Another piece of information may further be added to these pieces of information.

Instead of using the track head entry point, "flag information indicating that the corresponding cell has been located at the head position of the track" may be recorded in the cell information about the cell positioned at the head of the track. In this case, for example, "flag=1" can indicate that the corresponding cell is present at the head position of the track, and "flag=0" can indicate that the corresponding cell is present on the second or later track.

Furthermore, simultaneous display setting information for doing setting to display audio information and still picture information at the same time may be written in the cell information.

Figure 8:
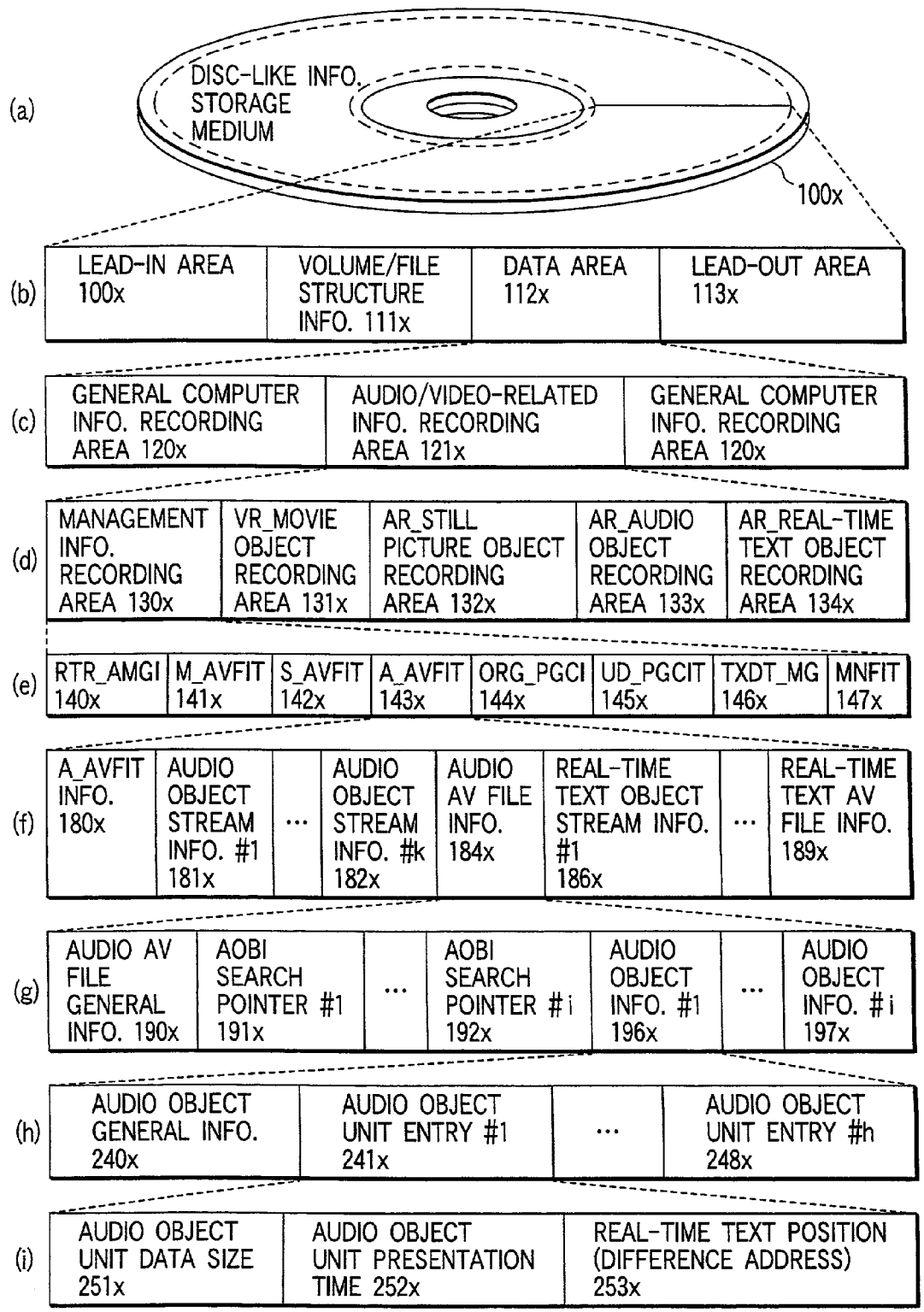
FIG. 8 is a diagram to help explain still another example of the recording data structure on a recordable/reproducible information medium.

FIG. 8 is a diagram to help explain still another example of the recording data structure on a recordable/reproducible information medium. As shown in (*c*) to (*e*) of FIG. 8, in a management information recording area 130X for an audio-and-video-related information recording area 121X, the following are recorded: RTR audio manager information (RTR_AMGI) 140X, a movie AV file information table (M_AVFIT) 141X, a still picture AV file information table (S_AVFIT) 142X, an audio file information table (A_AVFIT or AUD_FIT) 143X, original PGC information (ORG_PGCI) 144X, a user-defined PGC information table (UD_PGCIT) 145X, a text data manager (TXTDT_MG) 146, maker information table (MNFIT) 147X, and others.

Management information about the audio information in the AR_AUDIO.ARO 221X file shown in FIG. 7 has been recorded in the audio AV file information table (A_AVFIT or AUD_FIT) 143X of FIG. 8(*e*). (*e*) to (*i*) of FIG. 8 show hierarchically the audio AV file information table 143X, management information about audio.

As shown in FIG. 8(*f*), the audio AV file information table (A_AVFIT or AUD_FIT) 143X is composed of audio AV file information table information (AUD_FITI) 180X, one or more pieces of (a k number of) audio object stream information (AUD_STI #1 to AUD_STI #k) 181X to 182X, audio AV file information (AUDFI) 184X, one or more pieces of real-time text object stream information 186X, and real-time text AV file information 189X.

As shown in FIG. 8(*g*), the audio AV file information (AUDFI) 184X is composed of audio AV file general information (AUDFI_GI) 190X, one or more audio object information search pointers (AOBI_SRP #1 to AOBI_SRP #i) 191X to 192X, and one or more pieces of audio object information (AOBI #1 to AOBI #i) 196X to 197X.

Each piece of audio object information (e.g., AOBI #1) is composed of audio object general information (AOB_GI) 240X and one or more audio object unit entries (AOBU_ENT #1 to AOBU_ENT #h) 241X to 248X as shown in FIG. 8(*h*).

As shown in FIG. 8(*i*), each audio object unit entry (e.g., AOBU #1) is composed of an audio object unit data size (AOBU_SZ) 251X, audio object unit presentation time (AOBU_PB_TM) 252X, and a real time text position (difference address) 253X.

Each piece of audio object information (AOBI) of FIG. 8(*g*) may be composed of audio object general information (AOB_GI) and audio object unit information (AOBUI) (not shown).

In this case, although not shown, the audio object general information (AOB_GI) may be composed of AOB_TY indicating the form of the corresponding AOB (the target audio object) (not shown), AOB_REC_TM indicating the recording time of the corresponding AOB, AOB_REC_TM_SUB indicating information on the time equal to or shorter than one second (subsecond information) for the AOB_REC_TM, AUD_STIN indicating the audio stream information number of the corresponding AOB, AOB_A_S_PTM indicating the playback start time of the first audio frame in the corresponding AOB, AOB_A_E_PTM indicating the playback end time of the last audio frame in the corresponding AOB, and SCR_DIFF indicating the difference between the preceding AOB written in a system clock reference (SCR) and the corresponding AOB.

The audio object unit information (AOBUI) is composed of audio object unit general information (not shown) (AOBU_GI), and one or more audio object unit entries (AOBU_ENT #1 to AOBU_ENT #h) of FIG. 8(*h*).

Although not shown, the audio object unit general information (AOBU_GI) may include AOBU_PB_TM (corresponding to 252X in FIG. 8(*i*)) indicating the playback time of an audio object unit (AOBU), the AOBU's size AOBU_SZ (corresponding to 251X in FIG. 8(*i*)), L_AOBU_PB_TM indicating the playback time of the last AOBU in the corresponding AOB (the target audio object), L_AOBU_SZ indicating the size of the last AOBU, AOBU_ENT_Ns indicating the number of AOBU entries (an h number of AOBU entries in the example of FIG. 8(*h*)), and AOB_SA indicating the start address of the corresponding AOB.

Management information for the real-time text information (real-time text object; information whose contents of display vary in synchronization with audio information) written in AR_RT_TEXT.ARO 222X file of FIG. 7 can be recorded in (one or more pieces of) real-time text object stream information 186X and real-time text AV file information 189X in the audio AV file information table 143X (FIG. 8(*f*)).

When audio information is recorded (audio-recorded) onto a disc-like information medium 100X, audio recording is often effected on a plurality of tracks at a time. In this case, the audio information unit to be recorded at a time is called audio object (AOB). The individual AOBs are provided with pieces of management information, pieces of audio object information #1 to #i (196X to 197X of FIG. 8(*g*)), respectively.

To enable high-speed playback (fast-forward) of audio information, rewinding (fast reverse), and special playback, such as time search, the audio information is further divided into smaller data units (audio object unit AOBU) than AOB. Then, information about the data size (audio object unit data size 251X of FIG. 8(*i*)) in each data unit (AOBU) and the display required time (audio object unit presentation time 252X) is recorded in the relevant recording locations of the audio object unit entries #1 to #h (241X to 248X in FIG. 8(*h*)).

The position information (relative address/difference address) in the AR_RT_TEXT.ARO 222X file (FIG. 7) in which the real-time text information (real-time text object) displayed when the audio information at the head position in each data unit (AOBU) is reproduced has also been recorded in the audio object entries #1 to #h (241X to 248X) as real-time text position information 253X.

In each piece of cell information shown in FIG. 3(*g*), the number of AOB (audio object) specified by the relevant cell and the time information (start time and end time) for the relevant cell have been recorded. When the specified cell is reproduced, the cell within the time range specified in the specified AOB is reproduced. Specifically, using the information in the audio object unit entries #1 to #h (FIG. 8(*h*)) recorded in the pieces of audio object information (AOBI) #1 to #i for the time information, the time range specified for playback is converted into relative addresses in AR_AUDIO.ARO 221X. Thereafter, the desired audio information is reproduced.

Here, the playback start time can be selected arbitrarily. When the user specifies the corresponding track head entry point, playback can start from any track (a piece of music after editing). A still picture may be specified in such a manner that it is related to an audio track.

Figure 9:
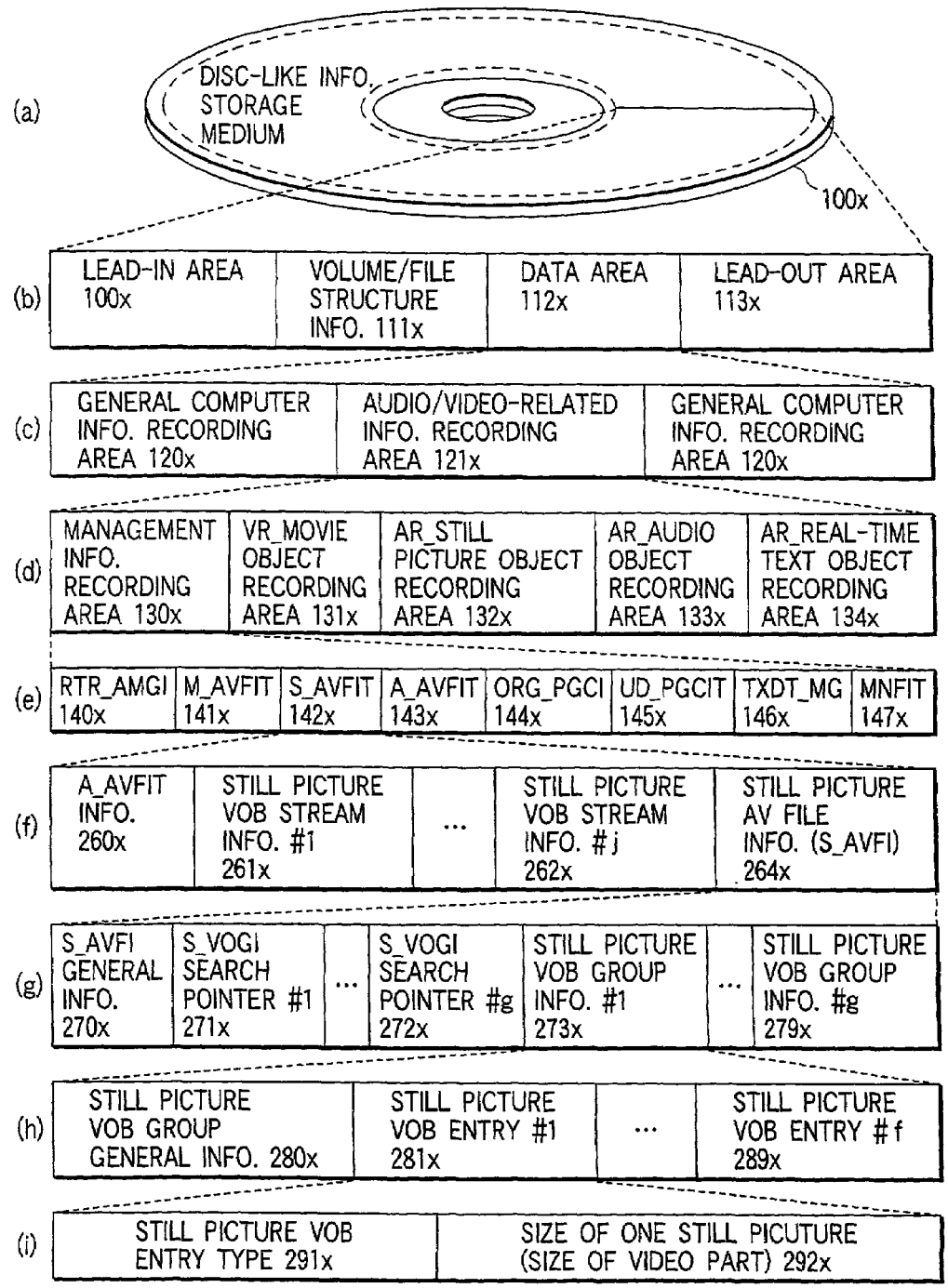
FIG. 9 is a diagram to help explain still another example of the recording data structure on a recordable/reproducible information medium.

FIG. 9 is a diagram to help explain still another example of the recording data structure on a recordable/reproducible information medium. Management information for the still picture information (still picture object) to be displayed simultaneously in reproducing the audio information has been recorded in the still picture AV file information table (S_AVFIT) 142X of FIG. 9(*e*). As shown in FIG. 9(*f*), the following area recorded in the S_AVFIT 142X: audio AV file information table information (A_AVFITI) 260X, one or more pieces of still picture VOB stream information #1 to #j, still picture AV file information (S_AVFI) 264X, and others.

As shown in FIG. 9(*g*), the following are recorded in S_AVFI 264X: still picture AV file information general information (S_AVFI_GI) 270X, one or more still picture VOB group information search pointers (S_VOGI_SRP) #1 to #g, one or more pieces of still picture VOB group information (S_VOOGI) #1 to #g, and others.

When the still picture information is recorded on the information medium 100X, a plurality of pages of still picture information are often recorded at a time. A collection of pages of still picture information to be recorded at a time is called still picture VOB group (S_VOG). Management information about the still picture VOB group is written in the pieces of still picture group information (S_VOGI) #1 to #g. On the basis of the management information, management is performed in still picture VOB groups.

Specifically, each of the still picture VOB entries (S_VOB_ENT) #1 to #f (281X to 289X in FIG. 9(*h*)) in S_VOGI #1 to #g (273X to 279X in FIG. 9(*g*)) has a still picture VOB entry type (S_VOB_ENT_TY) 291X and a still picture size (the size of the video part V_PART_SZ) 292X as shown in FIG. 9(*i*). Use of these pieces of information (S_VOB_ENT_TY, V_PART_SZ) enables management to be performed in still picture VOB groups.

Figure 10:
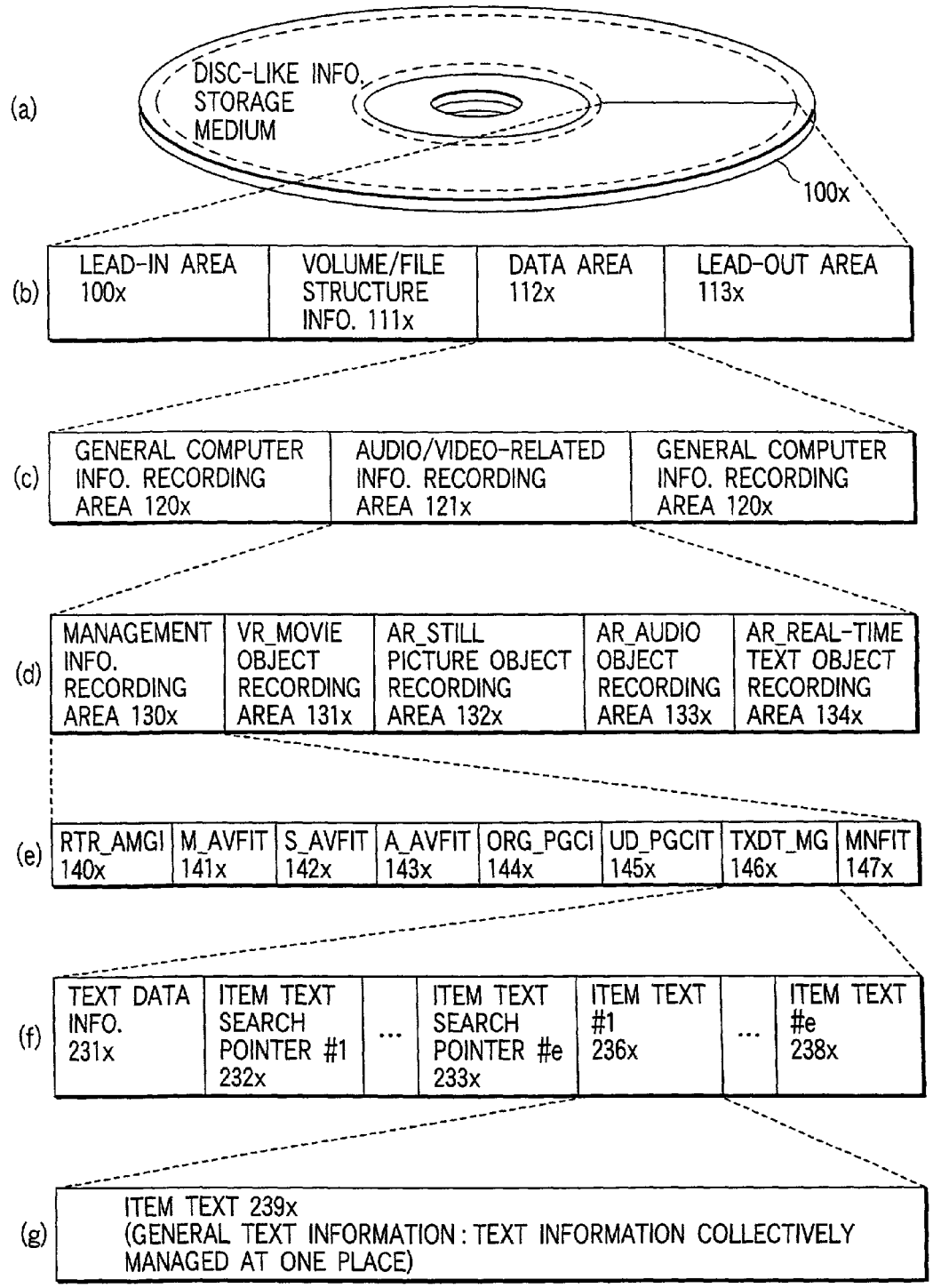
FIG. 10 is a diagram to help explain still another example of the recording data structure on a recordable/reproducible information medium.

FIG. 10 is a diagram to help explain still another example of the recording data structure on a recordable/reproducible information medium. Information peculiar to each track, including the name of a piece of music, the name of a singer, and the name of a performer, can be recorded in the track head entry point (not shown) as text information. A place in which text information with a relatively small amount of data, such as the name of a piece of music, the name of a singer, or the name of a performer is recorded is a recording area (not shown) called primary text information in the track head entry point.

In contrast, information that is peculiar to each track but cannot recorded in the primary text information because it has an enormous amount of data is allowed to be recorded in item texts (IT_TXT) #1 to #e (236X to 238X of FIG. 10(f)). In this case, in the track head entry pointer, only the pointer information (IT_TXT_SRP) with information indicating which one in the order of item texts is to be displayed is allowed to be recorded.

The item text information, as shown in (e) and (f) of FIG. 10, is put together and recorded in a text data manager (TXTDT_MG) 146X. Recorded in the text data manager (TXTDT_MG) 146X are text data information (TXTDTI) 231X, one or more item text search pointers (IT_TXT_SRP #1 to #e) 232X to 233X, one or more item texts (IT_TXT #1 to IT_TXT #e) 236X to 238X, and others.

Stored in the text data information (TXTDTI) 231X, a character set CHRS, the number of item text search pointers IT_TXT_SRP_Ns, the end address of the text data manager TXTDT_MG_EA, and others.

In each item text search pointer (IT_TXT_SRP #), the start address of the corresponding item text IT_TXT_SA, the size of the item text IT_TXT_SZ, and others are stored. In addition, each item text (239X in FIG. 10(g)) includes text written in the character code specified in the character set CHRS. These item texts may be called text information managed centrally at one place, or general text information.

As shown in (e) and (f) of FIG. 10, all the item text information is recorded at the same time, facilitating search, such as "text search", of the contents of all the item texts #1 to #e, which is helpful in making audio information search.

Figure 11:
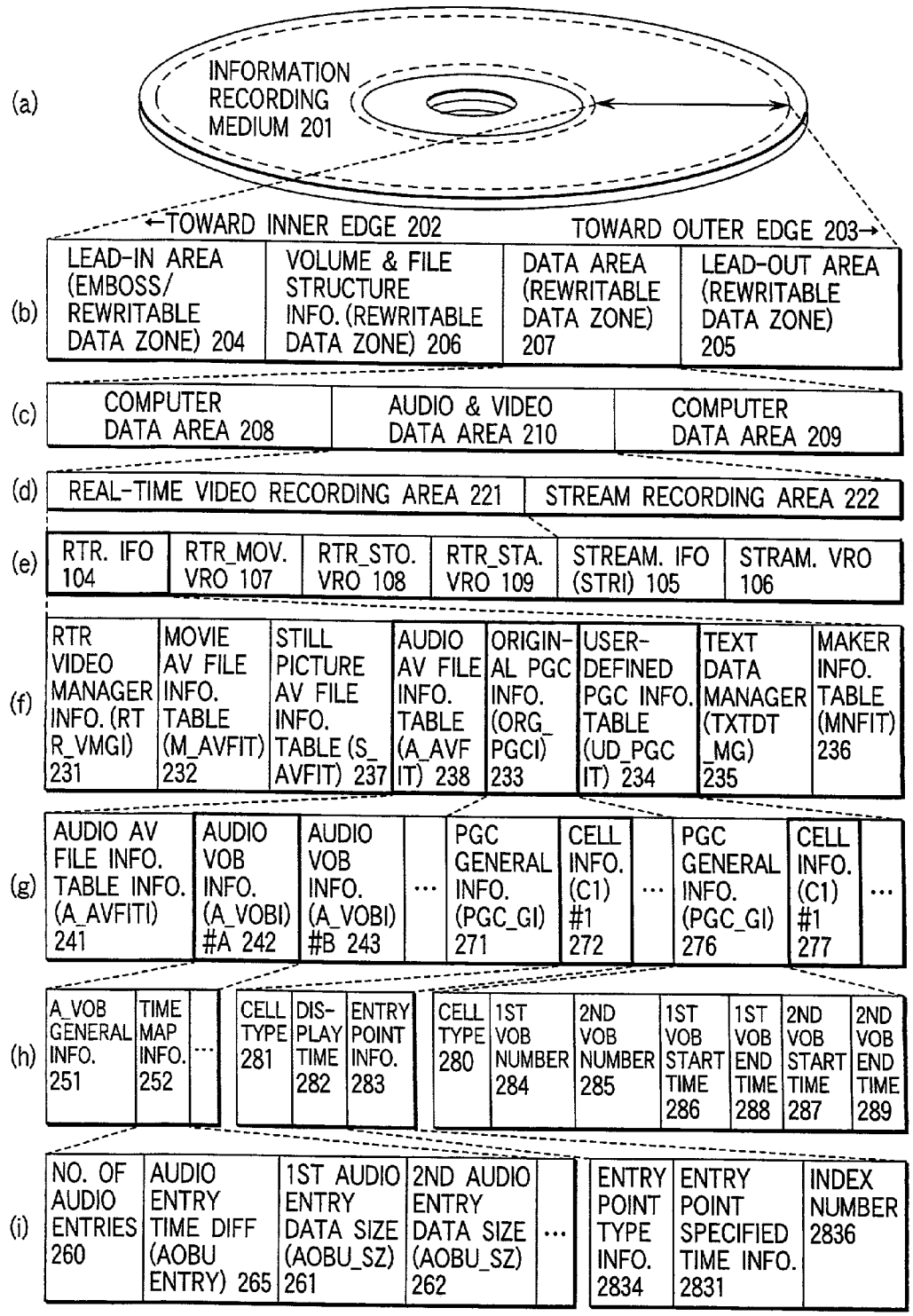
FIG. 11 is a diagram to help explain still another example of the recording data structure on a recordable/reproducible information medium.

FIG. 11 is a diagram to help explain still another example of the recording data structure on a recordable/reproducible information medium (an example of a case where audio index information is provided in the entry point information 283). The embodiment of FIG. 3(i) has illustrated the case where the position at which sound is started for the first time after a silent period has elapsed is specified in the entry point information 283. On the other hand, as one of its applications, more flexibility may be given to the entry point information 283. This application will be explained using FIG. 11.

The audio information, whose object is music, has a division unit of audio information called "a piece of music (song)." As an expression corresponding to the song, a division unit of audio information is called track (audio track). Furthermore, a specific segment in a track is called index. For example, when a track is caused to correspond to a symphony, a concerto, or a sonata in classical music, each movement corresponds to the index. Alternatively, when a popular song is caused to correspond to a track, a position at which a block changes to another block in the song (for example, the first verse, second verse, and third verse of the song) can be caused to correspond to the index.

Although explained in FIG. 3(i), "the position at which sound is started for the first time after a silent period has elapsed for the audio information including a silent period in one song" can be considered to be included in the index. Specifically, an expansion of a method/idea of using the step of specifying the first sound start position after the end of a silent period using the entry point information 283" is index specification or index designation.

The data structure of the entry point information 283 of FIG. 11(i) shows another embodiment of the data structure of the entry point information 283 of FIG. 3(i). In the case of a structure with a plurality of entry points, information about pieces of entry point type formation 2834, 2835 are needed as shown in FIG. 11(i) and FIG. 12(i) explained later.

In the embodiment of the present invention, the entry point structure of FIG. 11(i) enables "0101" or "0001" to be set as the entry point type information 2834. In the case of the entry point structure of FIG. 12(i), "0010" is allocated as the entry point type information 2835, whereas in the case of FIG. 3(i), "0011" is allocated, thereby making it possible to discriminate a difference in the data structure.

In a method of specifying an index, an index is specified by the playback time of audio information using the time map information (audio object unit entry point or audio entry) 252 shown in FIG. 1(g) or FIG. 3(h). The playback time information is specified in entry point specifying time information 2831. The number corresponding to a movement number in a symphony or a block number (the first verse, second verse, third verse, . . . ) in a popular song is recorded as an index number 2836.

Figure 12:
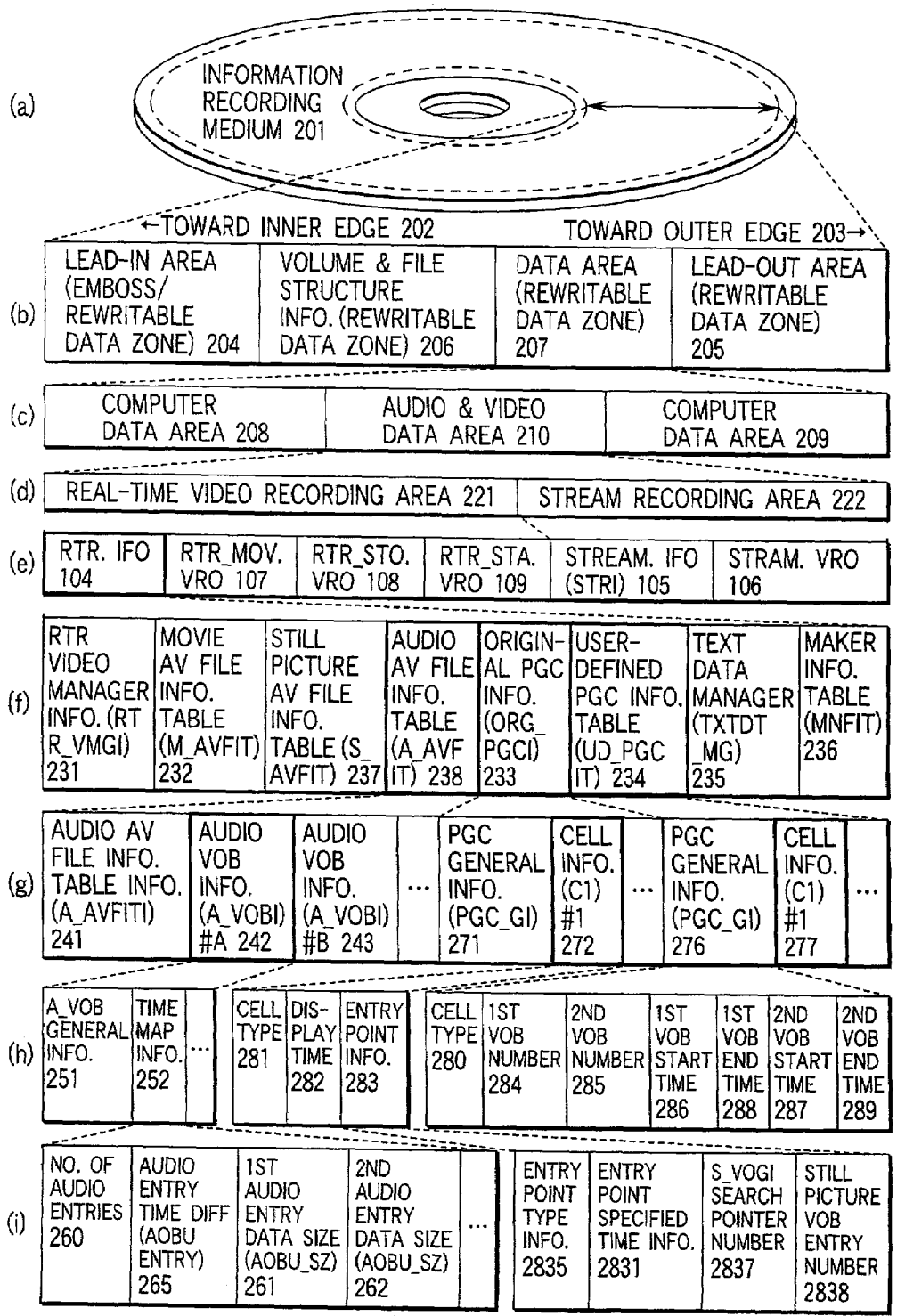
FIG. 12 is a diagram to help explain still another example of the recording data structure on a recordable/reproducible information medium.

FIG. 12 is a diagram to help explain still another example of the recording data structure on a recordable/reproducible information medium (an example of a case where information indicating still picture information to be displayed together with audio information has been provided in the entry point information 283).

In FIG. 3(h), the data structure that enables audio information, still picture information, and others to be displayed simultaneously using composite cells has been explained. On the other hand, the present embodiment employs a data structure that enables audio information and still picture information to be displayed simultaneously using the entry point information 283 as shown in (h) and (i) of FIG. 12.

In the case of the structure of FIG. 12(i), "0010" is set in the entry point type information 2835.

A still picture can be specified by the following steps of:
(1) specifying any one of the pieces of still picture VOB group information #1•273 to #g•279 by specifying the number of S_VOGI search pointer of FIG. 9(g) according to S_VOGI search pointer number 2837 and
(2) further specifying still picture VOB entries #1•281 to #f•289 of FIG. 9(h) according to a still picture VOB entry number 2838.

The timing for displaying the specified still picture can be set by the audio information playback time in the same cell according to the entry point specifying time information 2831 of FIG. 12(i).

In playback, the recording location of the audio object information recorded in AR_AUDIO.ARO 221X (FIG. 7) or RTR_AUD.VRO 114 (FIG. 2) corresponding to the above playback time can be searched for using the time map information for the audio information composed of the audio entries shown in FIG. 1(g) or audio object unit entries (AOBU_ENT) shown in FIG. 8(h).

The entry point information 283 indicates time information. The still picture may be displayed at that time and continue being displayed until the playback of the audio information in the same cell has been completed (or until the next still picture specified by the next piece of entry point information 283 has been displayed).

While in FIG. 3(h), FIG. 11(h), and FIG. 12(h), only one piece of entry point information 283 has been recorded in one cell, this is not restrictive and more than one piece of entry point information 283 may be recorded in one cell. Furthermore, while in FIG. 3(h), FIG. 11(h), and FIG. 12(h), the entry point information 283 has been recorded in cell information #1•272 in the original PGC information 233, this is not restrictive. For instance, the entry point information may be recorded in cell information #1•277 in the user-defined PGC information table 234.

The method of using the entry point information 283 is given more flexibility by specifying or designating not only the position at which sound is started for the first time after a silent period as shown in FIG. 3(i) but also an index number in the entry point information 283 as shown in FIG. 11(i).

For example, the searching or retrieval of the head part of a user-favored track, the specification or designation of a movement changing position in a symphony, a concerto, or a sonata in classical music, or the block (e.g., the first verse, second verse, and third verse) changing position in a popular song, can be specified by an index number in the entry point information 283. As a result, the user can directly jump to the user-favored part of the same song (track) or to the user-favored block by specifying the index number in the entry point information 283 shown in FIG. 11(i).

When the user specifies a still picture using the entry point information 283 as shown in FIG. 12(i) instead of specifying two types of VOB at the same time in a composite cell as shown in FIG. 3(h), not only the contents of the management information can be simplified, but also the editing processes, including partial erasing in songs and rearrangement, can be made simpler.

As a concrete example, a case where the same cell is divided in two and the first half is erased will be explained. In the case of the composite cell of FIG. 3(h), to synchronize the still picture with the audio information, it is necessary to change not only the first VOB start time 286 to the halved boundary time as the remaining part after erasing but also the second VOB start time 287. In contrast, when the data structure of FIG. 12(i) is used, it is necessary only to change the display time 282 in the cell and erase the entry point information 283 corresponding to the erase range.

Furthermore, when the entry point information 283 is used in setting the still picture information to be displayed simultaneously with the audio information as shown in FIG. 12(i), the synchronizing of the audio information with the still picture information necessary for the data structure of FIG. 3(h) is unnecessary.

In addition, when a still picture can be specified using the entry point information 283 as shown in FIG. 12(i), the display of the still picture can be set with an arbitrary timing for audio information playback. Specifically, as shown in FIG. 1(j), in the VOB entry for a still picture, the display time interval for each still picture has been predetermined. As a result, when the composite cell structure shown in FIG. 3(h) is used, the display timing for each still picture cannot be set arbitrarily for the playback time of the audio information. In contrast, when the data structure that determines the timing for a still picture to be displayed simultaneously with the playback of the audio information using the entry point information 283 as shown in FIG. 12(i) is used, the display timing for each still picture can be set independently using the entry point specifying time information 2831, the playback time of the audio information. Consequently, the display time of a still picture can be specified for an arbitrary audio information playback time.

In the cell information described in each of the above embodiments, simultaneous display setting information for setting simultaneous display of the audio information and still picture information (or audio information and video information) can be written.

Furthermore, the application of the data structure illustrated in the embodiments of the present invention is not limited to the optical disc (the information medium 201 or 100X in FIGS. 3 and 4 and FIGS. 8 to 12), and may be applied to a solid-state memory (such as a large-capacity semiconductor flash memory).

The effects of the present invention described above are outlined as follows:

1. As shown in (c) and (h) of FIG. 1, cells #2, #3, and #6 are defined for the individual audio VOB (AOB) #A to #C, respectively and cell type information is provided in the pieces of cell information corresponding to the individual cells. The cell type information makes it possible to discriminate between the video information (movie cells), still picture information (still picture cells), and audio information (audio cells), which enables the audio information to be managed in totally the same manner as the video information and still picture information. As a result, not only can the digital audio information be recorded on an information medium in the same manner as the video information and/or still picture information, but also the data can be reproduced or edited from or on the information medium.

As compared with the case where videotapes have been used for video information recording and MDs have been used for audio information recording, the present invention enables the video information and/or still picture information to be recorded in a mixed manner on a single information medium, which makes it possible for the user to record, reproduce, or edit audio/video/still-picture-mixed information with only one recording/reproducing unit. Furthermore, for example, the still picture information is combined with the audio information differing from the former in recording time and then the resulting information is reproduced, which gives a great flexibility to the playback method.

2. An audio VOB (AOB) is defined for the audio information, and not only the cells equivalent to the video information and still picture information are caused to correspond to audio VOB (AOB), but also the original PGC information indicating the playback sequence for the individual cells including the audio cells is provided in the audio VOB. With this setting, it seems to the user as if the video information to be recorded on a videotape, the audio information to be recorded on an audio tape, such as a cassette tape, and the still picture information to be recorded on a digital tape on which still picture information can be recorded were recorded in a mixed manner on a continues tape. By providing a mechanism for reproducing these pieces of information in the order in which they were recorded, in such a manner that they looks as if they were continuous as in a single tape, the user familiar with audio tape or video tape can use an information medium with the data structure of the present invention without a sense of incongruity.

3. The time map information (or time search table) is provided in the A_VOBI (or AOBI), management information about the audio information, which enables a cell in the user-defined PGC to specify the playback range arbitrarily using the time map information. As a result, any area in the video information, still picture information, and audio information can be reproduced in any sequence.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of recording audio information on a medium including,
an audio information recording area for recording audio information; and
a management area for recording management information with respect to the recording area, wherein,
said information medium is constructed so as to be able to record not only said audio information but also other information,
said management area is constructed so as to be able to further record management information with respect to information other than said audio information,
related information about the audio information and information other than the audio information during reproducing is stored in said management area,
said management area includes cell information containing entry point information, and
said entry point information is configured to include:
entry point type information indicating a type of an entry point,
entry point time information, and
index information configured to specify a head of part of said audio information,
wherein the audio information recorded on the audio information recording area is divided into a plurality of audio frames or audio units, or into audio entries at specific intervals,
said method comprising:
recording the audio information in the recording area; and
recording the management information including said related information and said cell information in the management area.

2. A method of reproducing audio information from a medium including,
an audio information recording area for recording audio information; and
a management area for recording management information with respect to the recording area, wherein,
said information medium is constructed so as to be able to record not only said audio information but also other information,
said management area is constructed so as to be able to further record management information with respect to information other than said audio information,
related information about the audio information and information other than the audio information during reproducing is stored in said management area,
said management area includes cell information containing entry point information, and
said entry point information is configured to include:
entry point type information indicating a type of an entry point,
entry point time information, and
index information configured to specify a head of part of said audio information,
wherein the audio information recorded on the audio information recording area is divided into a plurality of audio frames or audio units, or into audio entries at specific intervals, said method comprising:
reproducing the management information including said related information and said cell information from said management area; and
reproducing the audio information from the recording area.

3. An apparatus for recording audio information on a medium including,
an audio information recording area for recording audio information; and
a management area for recording management information with respect to the recording area, wherein,
said information medium is constructed so as to be able to record not only said audio information but also other information,
said management area is constructed so as to be able to further record management information with respect to information other than said audio information,
related information about the audio information and information other than the audio information during reproducing is stored in said management area,
said management area includes cell information containing entry point information, and
said entry point information is configured to include:
entry point type information indicating a type of an entry point,
entry point time information, and
index information configured to specify a head of part of said audio information,
wherein the audio information recorded on the audio information recording area is divided into a plurality of audio frames or audio units, or into audio entries at specific intervals,
said apparatus comprising:
a first unit configured to reproduce the management information including said related information and said cell information from the management area; and
a second unit configured to reproduce the audio information from the recording area.

4. An apparatus for reproducing audio information from a medium including,
an audio information recording area for recording audio information; and
a management area for recording management information with respect to the recording area, wherein,
said information medium is constructed so as to be able to record not only said audio information but also other information,
said management area is constructed so as to be able to further record management information with respect to information other than said audio information,
related information about the audio information and information other than the audio information during reproducing is stored in said management area,
said management area includes cell information containing entry point information, and
said entry point information is configured to include:
entry point type information indicating a type of an entry point,
entry point time information, and
index information configured to specify a head of part of said audio information,
wherein the audio information recorded on the audio information recording area is divided into a plurality of audio frames or audio units, or into audio entries at specific intervals, said apparatus comprising:
a first unit configured to reproduce the management information including said related information and said cell information from the management area; and
a second unit configured to reproduce the audio information from the recording area.

* * * * *